(12) United States Patent
Kawasaki et al.

(10) Patent No.: US 6,354,560 B1
(45) Date of Patent: Mar. 12, 2002

(54) MARKING DEVICE FOR MOLDING TOOL

(75) Inventors: Hiroaki Kawasaki; Hiroaki Maru; Nobuo Akiba, all of Mobara (JP)

(73) Assignee: Futaba Denshi Kogyo Kabushiki Kaisha, Mobara (JP)

( * ) Notice: Subject to any disclaimer, the term of this patent is extended or adjusted under 35 U.S.C. 154(b) by 0 days.

(21) Appl. No.: 09/453,488

(22) Filed: Dec. 3, 1999

(30) Foreign Application Priority Data

Dec. 4, 1998 (JP) ............................................ 10-345644

(51) Int. Cl.⁷ .............................................. B29C 33/00
(52) U.S. Cl. ........................ 249/103; 425/173; 249/104
(58) Field of Search ................................ 249/103, 104, 249/155; 164/229; 425/173, 190, 577, 556, 444

(56) References Cited

U.S. PATENT DOCUMENTS

| | | | | |
|---|---|---|---|---|
| 3,056,166 A | * | 10/1962 | Weinberg | 249/102 |
| 4,708,314 A | * | 11/1987 | Kuhling | 249/103 |
| 5,817,349 A | * | 10/1998 | Pruna | 425/542 |
| 5,824,350 A | * | 10/1998 | Wietrzynski | 425/190 |
| 5,902,512 A | * | 5/1999 | Streit | 249/103 |
| 5,922,264 A | * | 7/1999 | Schimmel | 264/255 |

* cited by examiner

Primary Examiner—Nam Nguyen
Assistant Examiner—Joseph S Del Sole
(74) Attorney, Agent, or Firm—Oblon, Spivak, McClelland, Maier & Neustadt, P.C.

(57) ABSTRACT

A marking device is provided that can confirm a mark imprinted on a molded piece from outside a molding tool and can inscribe a plurality of marks with a sole marker. The marking device consists of a reference sleeve, a top imprint portion, a sleeve, a top imprint portion, and a pin. The reference sleeve is fixedly assembled and has the top reference imprint surface confronting a molding area, a reference imprint mark being formed on the stamp surface. The top imprint portion is rotatably journaled within the reference sleeve and has the top display imprint surface being flush with the top reference imprint surface, on which data imprint marks to be pointed by a reference imprint mark are formed. The sleeve has a base end actuator, on which data display are indicated, formed at a protrusion protruded from a molding area outward. The top imprint member is rotatably journaled within the sleeve and has a top display imprint surface being flush with the top reference imprint surface, on which a data imprint mark to be pointed a reference imprint mark is formed. The pin has a base end actuator having a protrusion protruded from a molding area outward, on which data display indicators respectively corresponding to data imprint marks are indicated.

14 Claims, 14 Drawing Sheets

FIG.4(a)  FIG.4(b)
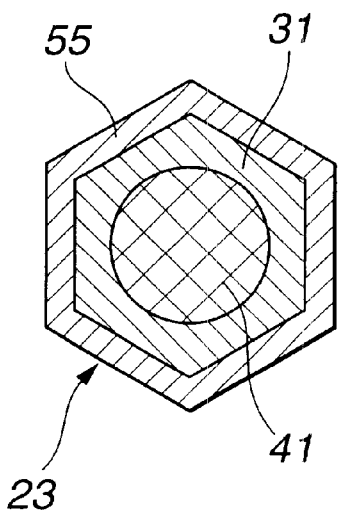
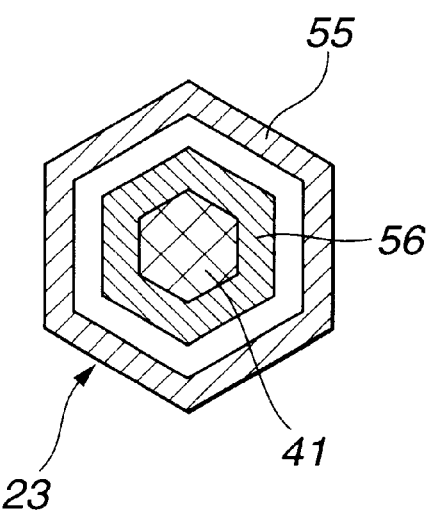
FIG.5
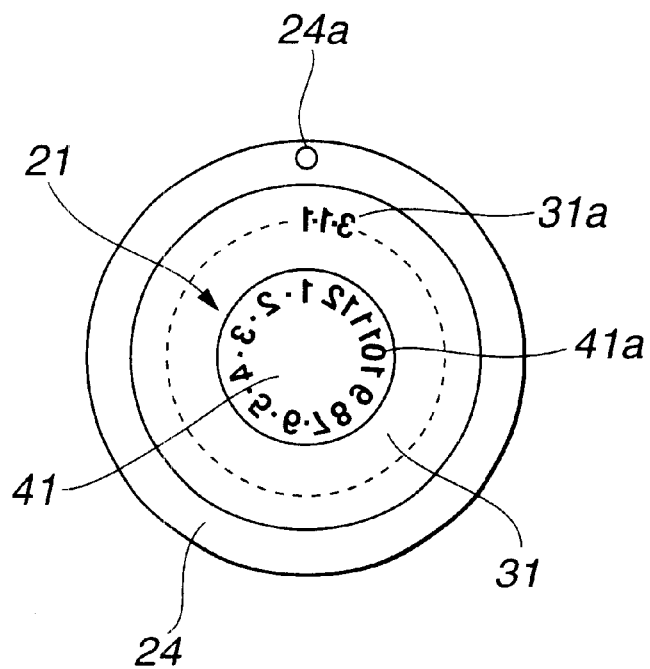

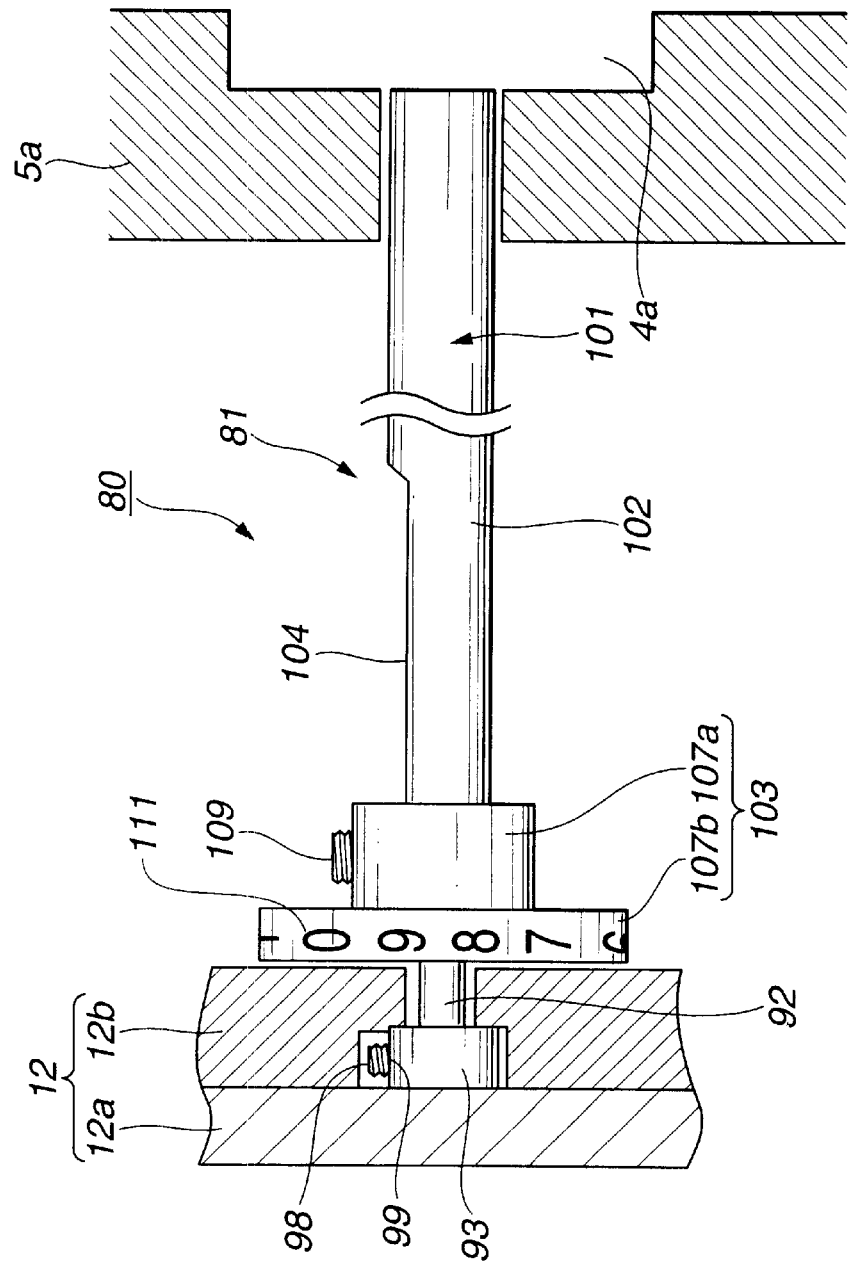
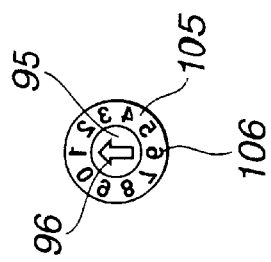
FIG.9(a)
FIG.9(b)

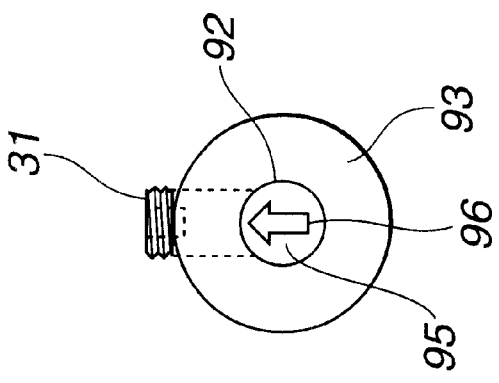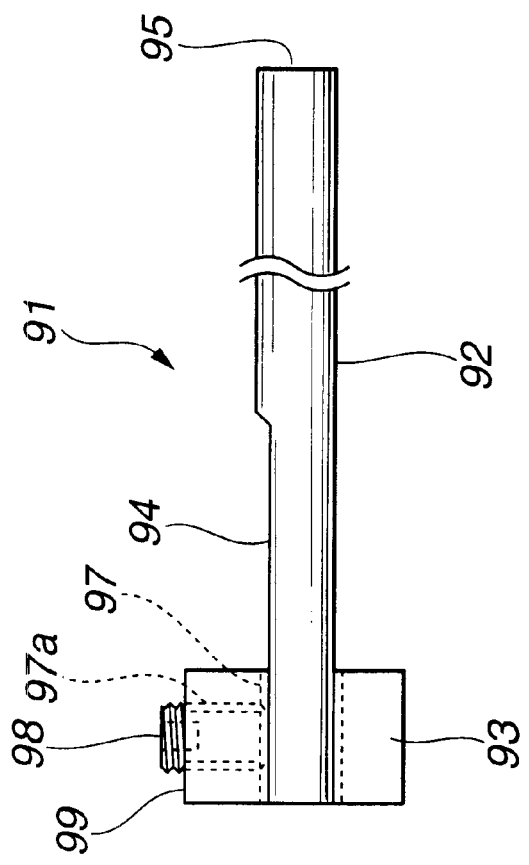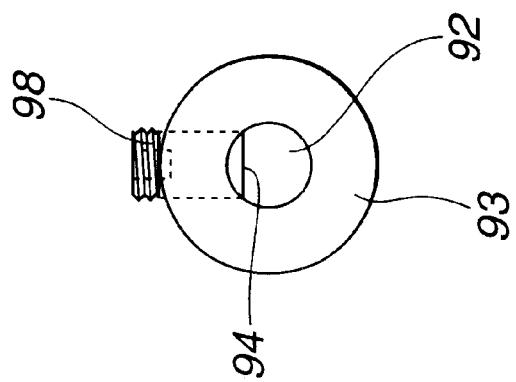

PRIOR ART FIG.17(a)
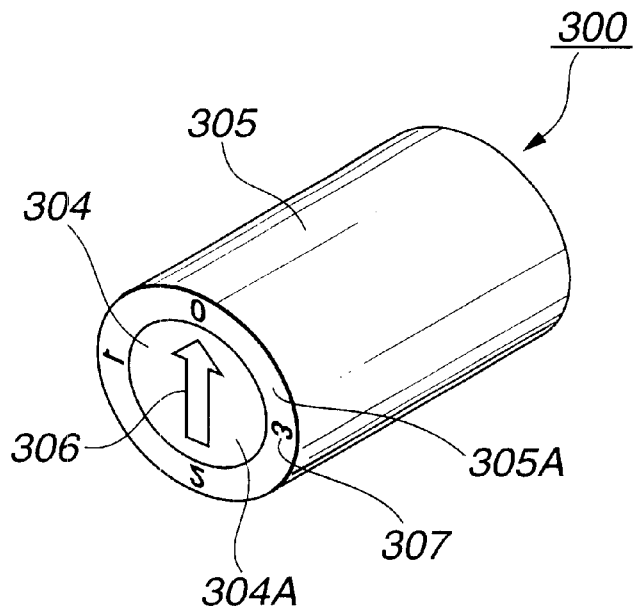
PRIOR ART FIG.17(b)
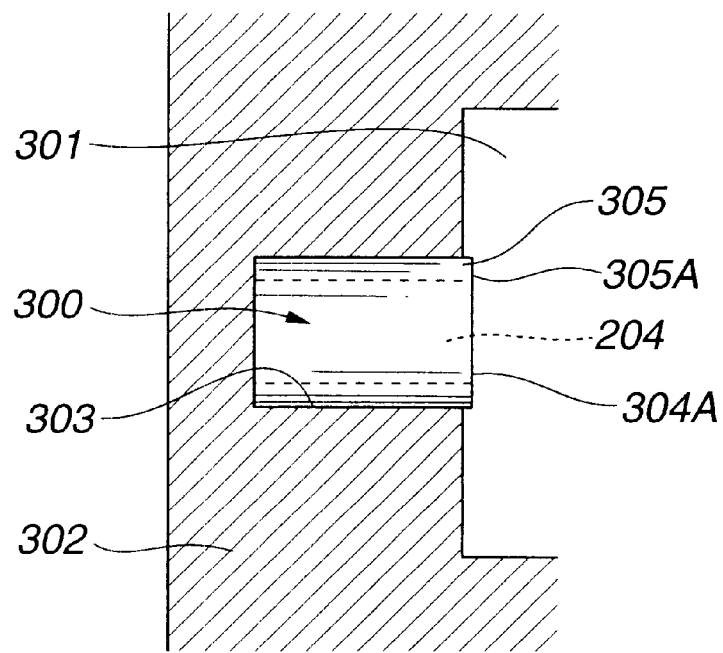

MARKING DEVICE FOR MOLDING TOOL

BACKGROUND OF THE INVENTION

1. Field of the Invention

The present invention relates to a marking device suitable for a molding tool. More particularly, the present invention relates to a marking device assembled in a molding tool, for imprinting marks on a surface of an item to be molded (hereinafter abbreviated as a molded piece) during the molding of the molded piece. The marking device mark imprints marks for use in quality control or lot control, for example, date, lot number and so on.

2. Description of the Prior Art

Conventionally, in order to perform quality control and lot control of various molded items, data regarding production date, lot number and so on are imprinted on surfaces of molded items with the date marker built in a molding tool.

The recent trend is to control daily and finely the quality guarantee of molded items. For the production control and product control of molded, it has become indispensable to inscribe the date of production on molded items with the mold date maker.

Conventional mold date markers (hereinafter abbreviated to markers) are classified into two types. In one type, a marker is buried in a countersunk hole formed in the inner surface of the mold member of a molding tool. In the other type, an ejector pin which has the surface exposed on the cavity side of a molding tool, desired marks being engraved on the surface, is used as a marker.

A conventional marker built in as one set is illustrated in FIGS. 17(a) and (b). FIG. 17(a) is a perspective view illustrating a marker, viewed from marks inscribed on one end. FIG. 17(b) is a cross-sectional view partially illustrating a marker assembled in the inner surface of a molding tool.

The marker 300, as shown in FIG. 17(a), consists of inner column members 304 and an outer cylindrical member 305 for rotatably holding the inner members 304 on the same axis, with the end surfaces flushed with the end surfaces of the inner members 304. The marker 300, as shown in FIG. 17(b), is built in the molding tool 202 by press-fitting the outer member 305 to the countersunk hole 303 being a recess formed inside the molding tool 302 communicating with the cavity 301.

A normally figured display mark 300, e.g. "arrow", is engraved on the exposed end surface 304A of the rotatable inner members 304 disposed near in the cavity 301. Mirror-image (reversed) character marks 307 of 0 to 3, each representing the tenth digit of a date, are engraved on the exposed end surface 305A of the outer member 305.

In order to change the date of the marker 300, the tip of a minus screwdriver is first inserted into the recess of the arrow mark 306 on the inner member 304. Then, the arrow mark 306 is rotated with the screwdriver to set it to the mark 307 corresponding to a date number on the outer member 305.

However, in the conventional marker shown in FIGS. 17(a) and 17(b), a countersunk hole 303 must be previously formed with high precision in the inner surface of the molding tool 302 to embed the marker 300. It has been very difficult to machine the countersunk hole 303 with a high precision.

Moreover, in order to change of the date of the marker 300, the molding tool 302 is disassembled from the molding machine (not shown). The date is adjusted with a special tool. Meanwhile, the positional relationship between the mark 306, or "the tip of the arrow", on the exposed end of the inner member 304 and the marks 307, or "date numbers 0 to 3", on the exposed end of the outer member 305 are checked. This setting work is very troublesome and takes much time to accomplish. Particularly, when the marker 300 is not viewed from outside the molding tool 302 because of the shape of the molded piece, the molding tool 302 needs to be assembled out of the molding machine. After the relative positional relationship between the marks 306 and 307 are adjusted, the molding tool 302 is re-assembled to the molding machine. Hence, the work involved is more complicated.

Moreover, when the mark 307 to be imprinted on a molded piece represents "day", 32 equally-divided readings and "1", "5", "10", "15", "20" and "25" as mirror-image numbers representing "day" must be engraved on the display surface of the marker 300. The small readings and mirror-image numbers make the positioning procedure quite difficult.

The marker of the type adopting an ejector pin is well known, as described previously. In this marker, desired marks are engraved on the end surface of the ejector pin exposed to the cavity.

However, in such a marker, the mark imprinted on a molded piece is limited to one display. Hence, every time the setting of the mark is changed, the molding tool must be reassembled by taking the ejector plate out of the molding tool and then attaching an ejector pin with a new mark. Hence, this type of marker is not suitable when marks are often changed.

Usually, the marker of that type imprints one label (display) to one molded piece. For instance, when two labels including the "month" and "day" are inscribed on a molded piece to be produced, two markers respectively corresponding to them must be installed on one molding tool. Hence, this marker requires installation spaces for the two markers.

SUMMARY OF THE INVENTION

The present invention is made to solve the above-mentioned problems.

Moreover, the objective of the invention is to provide a marking device for a molding tool that can substantially confirm marks to be imprinted on a molded piece from outside the molding tool and can easily change the setting of a mark as promptly as possible.

Moreover, the objective of the present invention is to provide a marking device that can imprint plural marks with a sole marker.

The objective of the present invention is achieved by a marking device for a molding tool, the marking device including a fixing-side blank having a cavity and forming one section of the molding tool, a core confronting the cavity and forming the other section of the molding tool, and a movable-side blank which can be relatively opened or closed with respect to the fixing-side blank, the marking device being attached on the side of the cavity or core, whereby a changeable mark is imprinted on a surface of a molded piece to be formed within a molding area between the cavity and the core, the marking device further comprising a reference sleeve fixedly attached, the reference sleeve having a reference imprint mark formed on a top reference imprint surface exposed to the molding area; and a pin member rotatably journaled within the reference sleeve and having a top imprint member and a base end actuator, the top imprint member having a top display imprint surface which is flush with the top reference imprint surface, on which data imprint marks to be pointed by the reference imprint mark are formed, the base end actuator displaying data display indicators respectively corresponding to the data imprint marks, on a protrusion protruded from the molding area outward; whereby the base actuator is selectively rotated based on each data stamp indicator of the pin member so that a data imprint mark selected by the top imprinting member is set on a reference imprint mark of the reference sleeve.

In the marking device according to the present invention, the top imprinting member and the base actuator of the pin member are respectively configured; and further comprises another connection member for mutually connecting the top imprinting member and the base end actuator portion.

In the marking device for a molding tool, by selectively rotating the base-end accumulator of the pin, a desired data imprint mark on the top imprinting member confronting the molding area can be accurately and simply set on the reference imprint mark of the reference sleeve. The pin can be easily machined and assembled.

In the marking device according to the present invention, the base end actuator is rotated to display the reference display indicator outside the molding area and to set a selected data display indicator of the pin member on the reference display indicator.

In the marking device for a molding tool, by selectively setting the data display indicator of the pin on the reference display indicator in a rotating operation of the base-end actuator, a desired data imprint mark on the front-end imprinting member confronting the molding area can be easily and accurately agreed with the reference imprint mark of the reference sleeve.

According to the present invention, in a marking device for a molding tool, the marking device including a fixing-side blank having a cavity and forming one section of the molding tool, a core confronting the cavity and forming the other section of the molding tool, and a movable-side blank which can be relatively opened or closed to the fixing-side blank, the marking device being attached on the side of the cavity or core, whereby a changeable mark is imprinted on a surface of a molded piece to be formed within a molding area between the cavity and the core, the marking device further comprising reference sleeve fixedly attached, the reference sleeve having a reference imprint mark formed on a top reference imprint surface exposed to the molding area; a sleeve member rotatably journaled within the reference sleeve and including a first top imprinting member and a first base end actuator, the first top imprinting member having a first top display imprint surface being flush with the top reference imprint surface, on which first data imprint marks to be pointed by the reference imprint mark are formed, the first base end actuator having a protrusion protruded from the molding area outward, on which first data display indicators respectively corresponding to the first data imprint display marks are displayed; and a pin member rotatably journaled within the sleeve and including a second top stamping member and a second base end actuator, the second top imprinting member having a second top display imprint surface being flush with the top reference imprint surface, on which second data imprint marks to be pointed by the reference imprint mark are formed, the second base end actuator having a protrusion protruded from the molding area outward, on which second data display indicators respectively corresponding to the second data imprint display marks are displayed; and whereby the first and second base end actuators are respectively and selectively rotated based on the first data display indicator of the sleeve member and the second data display indicator of the pin member so that a first data imprint mark respectively selected on the first top imprinting member as well as a second data imprint mark respectively selected on the second top imprinting member are set on said reference imprint mark of the reference sleeve.

In the marking device for a molding tool, by respectively and selectively rotating the first base-end actuator of the sleeve and the second base-end actuator of the pin, a desired first data imprint mark of the first top imprinting member confronting the molding area and a desired second data imprint mark of the second top imprinting member confronting the molding area can be accurately and simply set on the reference imprint mark of the reference sleeve.

In the marking device according to the present invention, the sleeve member of the first top imprinting member, on which the first data imprint marks are formed, as well as the sleeve of the first base end actuator, on which the first data display indicators are formed, are constructed in a concentric configuration.

In the marking device, plurality of data imprint marks respectively corresponding to a plurality of data display indicators of sleeves in a concentric configuration can be accurately and simply made to correspond with the reference imprint mark of the reference sleeve.

In the marking device according to the present invention, the first top imprinting member and the first base end actuator of the sleeve member as well as the second top imprinting member and the second base end accumulator of the pin member are respectively configured; and further comprises a first connection member connecting the first top imprinting member and the first end actuator, and a second connection member connecting the second top imprinting member and the second base end actuator.

In the marking device, the sleeve and the pin can be easily machined and assembled.

In the marking device according to the present invention, the reference display indicator is displayed outside the molding area; and the first base end actuator is rotated to set a selected first data display indicator of the sleeve member on the reference display indicator and the second base end actuator is rotated to set a selected second data display indicator of the pin member on the reference display indicator.

In the marking device for a molding tool, by rotating the first base-end actuator of the sleeve and the second base-end actuator of the pin, the first data display indicator of the sleeve and the second data display indicator of the pin are selectively made to correspond with the reference display indicator. Thus, a desired first data imprint mark on the first top imprinting member confronting the molding area and a desired second data imprint mark on the second top imprinting member confronting the molding area can be accurately and simply set on the reference imprint mark of the reference sleeve.

Moreover, according to the present invention, in a marking device for a molding tool, the marking device having a fixing-side blank having a cavity and defining one section of the molding tool, a core forming the other section of the molding tool confronting the cavity; a molding area defined between the cavity and said core, a movable-side blank which can be relatively opened or closed to the fixing-side blank, and an ejector plate on which an ejector pin is disposed, the end surface of the ejector pin being exposed to the molding area through said core, the marking device being suitable to a molding tool wherein when the movable-side blank is opened, a molded piece is ejected from the molding area with the ejector pin, the marking device having the base end held to the ejector plate, with the front end surface confronting the molding area through the core, to form a changeable imprint mark on a surface of a molded piece to be formed in the molding area, the marking device comprises a reference sleeve fixedly attached to the core, the reference sleeve having a reference imprint mark formed on a top reference imprint surface confronting the molding area; and a pin member rotatably journaled within the reference sleeve via the core and having a first top imprinting member and a first base end actuator, the first top imprinting member having a top display imprint surface being flush with the top reference imprint surface, on which data imprint marks to be pointed by the reference imprint park are formed, the first base end actuator being held by the ejector plate protruded from the core outward, data display indicators respectively corresponding to the data stamp marks being displayed on the holding portion; whereby the base actuator is selectively rotated based on each data stamp indicator of the pin member so that a data imprint mark selected by said top imprinting member is set on a reference imprint mark of the reference sleeve.

In the marking device according to the present invention, the top imprinting member and the base actuator of the pin member are respectively configured; and further comprising another connection member for mutually connecting the top imprinting member and the base end actuator portion.

In the marking device for a molding tool, a desired data imprint mark on the top imprinting member confronting the molding area can be accurately and simply set on the reference imprint mark of the reference sleeve, by selectively rotating the base-end actuator of the pin.

In the marking device according to the present invention, the base end actuator is rotated to display the reference display indicator outside the molding area and to set a selected data display indicator of the pin member on the reference display indicator.

In the marking device for a molding tool, the data display indicator of the pin is selectively set to the reference display indicator by rotating the base-end actuator of the pin. Thus, a desired data imprint mark on the top imprinting member confronting the molding area can be accurately and simply made to correspond with the reference imprint mark of the reference sleeve.

According to the present invention, in a marking device for a molding tool, the marking device having a fixing-side blank having a cavity and defining one section of the molding tool, a core forming the other section of the molding tool confronting the cavity, a molding area defined between the cavity and the core, a movable-side blank which can be relatively opened or closed to the fixing-side blank, and an ejector plate on which an ejector pin is disposed, the end surface of the ejector pin being exposed to the molding area through the core, the marking device being suitable to a molding tool where when the movable-side blank is opened, a molded piece is ejected out of the molding area with the ejector pin, the marking device having the base end held to the ejector plate, with the front end surface confronting the molding area through said core, to form a changeable imprint mark on a surface of a molded piece to be formed in the molding area, the marking device comprising a reference sleeve fixedly attached to the core, the reference sleeve having a reference imprint mark formed on a top reference imprint surface confronting the molding area; a sleeve member rotatably journaled within the reference sleeve via the core and having a first top imprinting member and a first base end actuator, the first top imprinting member having a first top display imprint surface being flush with the top reference imprint surface, on which the first data imprint marks to be pointed by the reference imprint mark are formed, the first base end actuator having a holding portion protruded from the molding area outward and held by the ejector plate, on which first data display indicators respectively corresponding to the first data imprint marks are formed; a pin member rotatably journaled within the reference sleeve and having a second top imprinting member and a second base end actuator, the second top imprinting member having a second data stamp mark is formed on a second top display imprint surface being flush with the top reference imprint surface and a first top display imprint surface, on which the second data imprint marks to be pointed by the reference imprint mark are formed, the second base end actuator having a holding portion protruded from the molding area outward and held by the ejector plate, on which second data display indicators respectively corresponding to the second data imprint marks are formed; wherein the first and second base end actuators are respectively and selectively rotated based on the first data display indicator of the sleeve member and the second data display indicator of the pin member so that a first data imprint mark respectively selected on the first top imprinting member as well as a second data imprint mark respectively selected on the second top imprinting member are set on the reference imprint mark of the reference sleeve.

In the marking device for a molding tool of the present invention, by respectively and selectively rotating the first base-end actuator of the sleeve member and the second base-end actuator of the pin, a desired first data imprint mark on the first front-end imprinting member confronting the molding area and a second desired data imprint mark on the second front-end imprinting member confronting the molding area can be accurately and simply set on the reference imprint mark of the reference sleeve.

In the marking device according to the present invention, the sleeve member of the first top imprinting member, on which the first data imprint marks are formed, as well as the sleeve of the first base end actuator, on which the first data display indicators are formed, are constructed in a concentric configuration.

In the marking device for a molding tool of the present invention, a plurality of imprint marks corresponding to a plurality of data display indicators of sleeves in a concentric configuration can be accurately and simply set on the reference imprint mark of the reference sleeve.

In the marking device according to the present invention, the first top imprinting member and the first base end actuator of the sleeve member as well as the second top imprinting member and the second base end accumulator of the pin member are respectively configured; and further comprising a first connection member connecting the first top imprinting member and the first end actuator, and a second connection member connecting the second top imprinting member and the second base end actuator.

In the marking device for a molding tool, the sleeve and the pin can be easily machined and assembled.

In the marking device according to the present invention], the reference display indicator is displayed outside the molding area; and the first base end actuator is rotated to set a selected first data display indicator of the sleeve member on the reference display indicator and the second base end actuator is rotated to set a selected second data display indicator of the pin member on the reference display indicator.

In the marking device for a molding tool of the present invention, when the first base-end actuator of the sleeve and the second base-end actuator of the pin are rotated, the first data display indicator of the sleeve and the second data display indicator of the pin can be selectively set on the reference display indicator. Thus, a desired first data imprint mark on the first front-end imprinting member confronting the molding area and a desired second data imprint mark on the second front-end imprinting member confronting the molding area can be accurately and simply set on the reference imprint mark of the reference sleeve.

BRIEF DESCRIPTION OF THE DRAWINGS

This and other objects, features, and advantages of the present invention will become more apparent upon a reading of the following detailed description and drawings, in which:

FIG. 4(a) is a horizontal cross sectional view illustrating the marking device, taken along the line A—A of FIG. 3;

FIG. 4(b) is a horizontal cross sectional view illustrating the marking device, taken along the line B—B of FIG. 3;

FIG. 5 is an explanatory diagram illustrating stamp marks formed on the top imprinting member of the marking device;

FIG. 9(a) is a vertical cross sectional view illustrating the main portion of a making device assembled to a molding tool;

FIG. 9(b) is an explanatory diagram illustrating the top marking surface of an ejector pin with a marker, viewed from the cavity side;

FIG. 10(a) is a side view illustrating the configuration of a pin of the ejector pin with a marker;

FIG. 10(b) is a cross sectional view illustrating one end of the pin;

FIG. 10(c) is a cross sectional view illustrating the base end of the pin;

FIG. 17(a) is a perspective view illustrating a conventional maker assembled as one set, viewed from the marks imprinted on the end of the marker; and FIG. 17(b) is a cross sectional view partially illustrating the marker inserted in a molding tool.

DESCRIPTION OF THE PREFERRED EMBODIMENTS

Embodiments of a marking device for a molding tool, according to the present invention, will be described below with reference to FIGS. 1 to 15.

Figure 1:
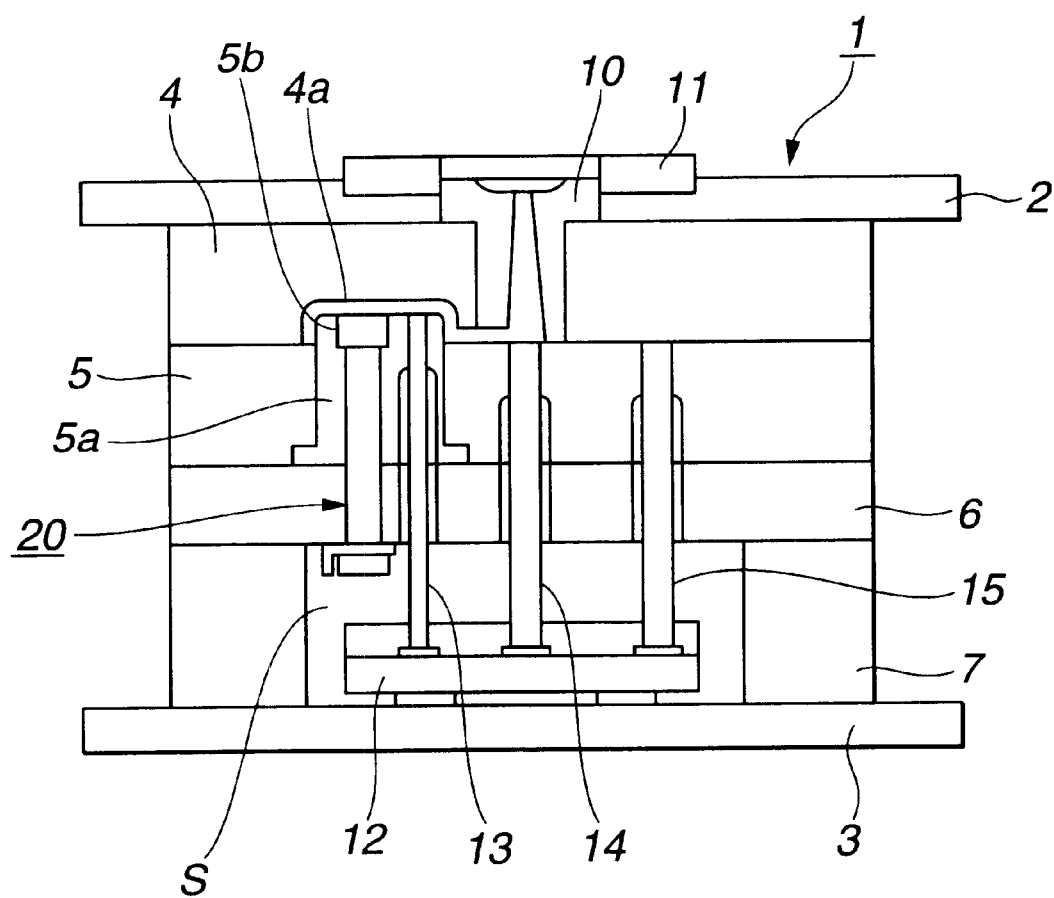
FIG. 1 is a vertical cross-sectional view illustrating a marking device built in a molding tool, according to a first embodiment of the present invention.

FIG. 1 is a vertical cross-sectional view illustrating a marking device for a molding tool, according to the first embodiment of the present invention.

Referring to FIG. 1, a molding tool 1 (hereinafter abbreviated as a mold) has a fixing-side holding plate 2 attached to the fixing-side holder of a molding machine (not shown) and a movable-side holding plate 3 attached to a variable-side holder. A fixing-side blank 4 with a female cavity 4a is fixed to the fixing-side holding plate 2. A movable-side blank 5 is fixed to the movable-side holding plate 3 via a backing plate 6 and a spacer block 7. The movable-side blank 5 has a male core Sa confronting the cavity 4a.

The molding tool 1 is separable into the fixing-side blank 4 and the movable-side blank 5. The movable-side plate 5 moves perpendicularly (or to the vertical orientation of FIG. 1) to the fixing-side blank 4 according to the movement of the holder of the molding machine. Thus, the movable-side blank 5 can be opened or closed to the fixing-side blank 4.

A plurality of guide bushes 8, as clearly understood from FIG. 6 (to be described later), are respectively disposed at plural portions of the fixing-side blank 4. Guide posts 9, respectively disposed at suitable positions of the variable-side blank 5, are slidably inserted into the guide bushes 8, respectively. The variable-side blank 5 is guided with the guide bushes 8 and the guide posts 9 and is opened or closed to the fixing-side blank 4. With movable-side blank 5 closed to the fixing-side blank 4, the cavity 4a and the core 5a are mutually assembled at a predetermined position accurately and with high precision. Thus, a predetermined molding area, that is, a molding die is formed in the molding tool.

A spool 10 and a locating ring 11 are disposed to the fixing-side holding plate 2. The spool 10 acts as a runner that injects a molten resin from the injection nozzle of the cylinder of a molding machine into a molding tool. The locating ring 11 acts as positioning means for attaching the molding tool 1 or the spool 10 to the injection nozzle of the cylinder. An ejector plate 12, which can move within a space defined with the spacer block 7 by a predetermined distance, is disposed to the movable-side holding plate 3.

The detail structure of a marking device forming the main portion of the present invention, or the detail structures of various embodiments, will be described later. In the first embodiment, in order to built in the molding tool 1, the marking device 20 penetrates the core 5a disposed to the movable-side holding plate 3 of the molding tool 1 and the backing plate 6 holding the movable-side holding plate 3. The marking device 20 has the front end that has a imprint surface to make a desired mark on a molded piece. The front end is flush with the surface of the core 5a and confronts the cavity 4a. A base-end actuator with control means for changing the mark on the top imprint surface is protruded and exposed in the space S from the surface of the backing plate 6.

An ejector pin 13 is disposed to the ejector plate 12. The ejector pin 13 is pushed out from the core 5a when the molding tool is opened, to eject a molded piece out of the molding tool. An ejector pin 14 is disposed on the nearly middle portion of the ejector plate 12 to eject a runner, or an unwanted molded portion, left within the spool 10, together with a molded piece. Return guide pins 15 are disposed to smoothly guide and return the ejector pin plate 12 and the ejector pins 13 and 14 to the initial position.

A specific structure of the marking device 20 will be described below with reference to FIGS. 2 to 5.

Figure 2:
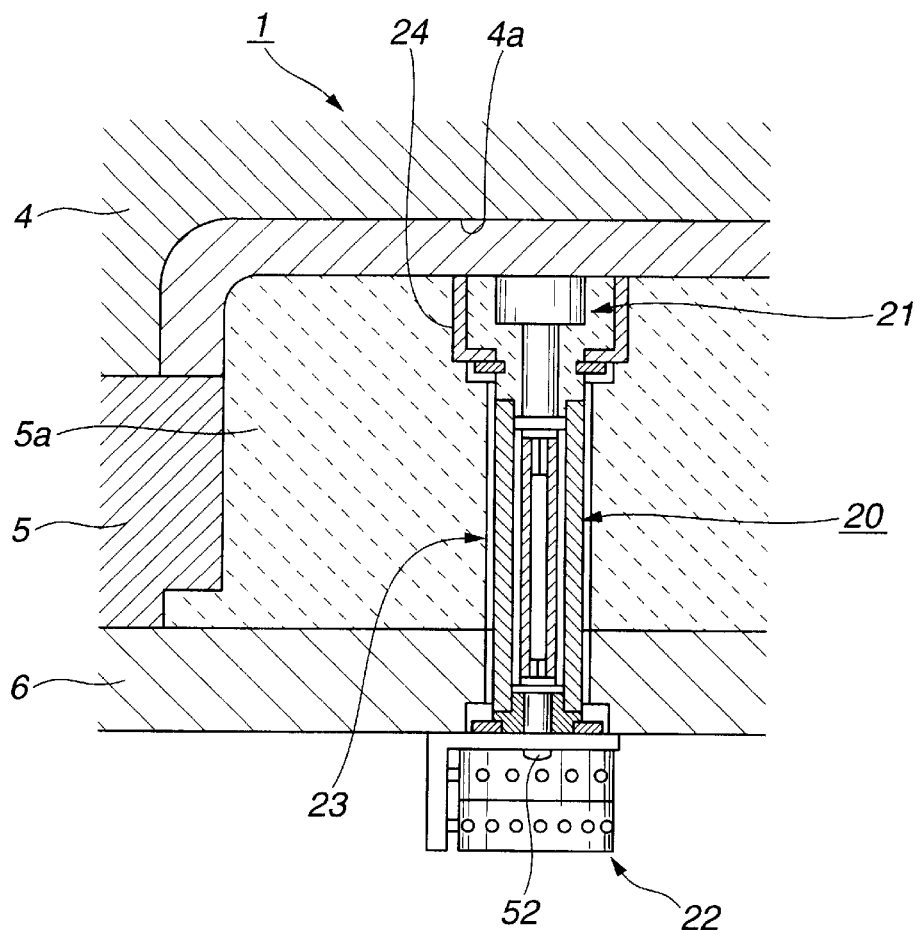
FIG. 2 is an enlarged vertical cross-sectional view schematically illustrating the main portion of a marking device built in a molding tool, according to the first embodiment.
Figure 3:
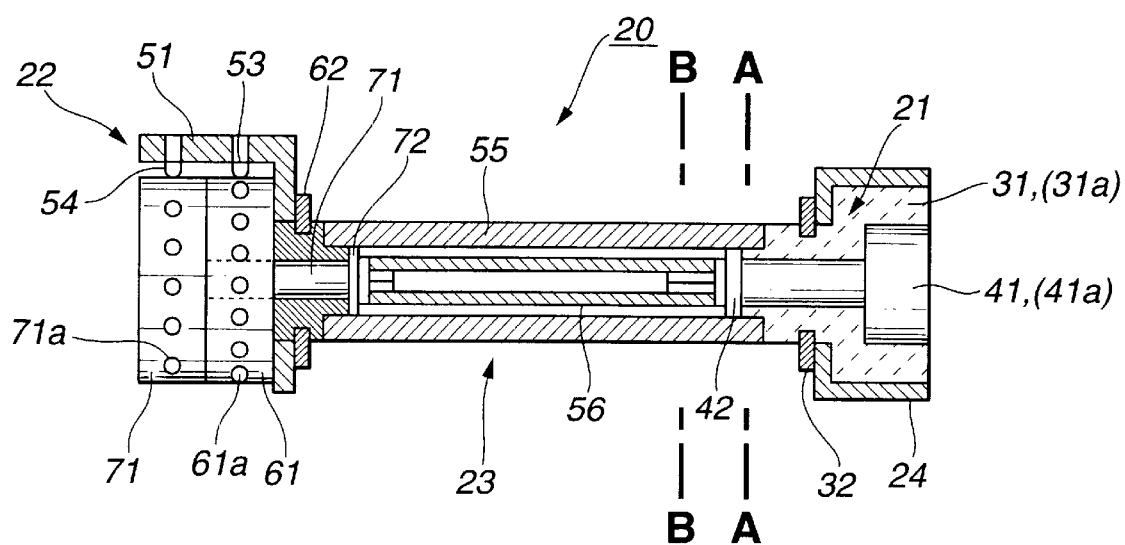
FIG. 3 is a vertical cross sectional view illustrating the whole of the marking device according to the first embodiment.

FIG. 2 is a vertical cross-sectional view illustrating the enlarged main portion of the marking device 20 built in the molding tool 1. FIG. 3 is a vertical cross-sectional view illustrating the whole of the marking device 20. FIG. 4(a) is a horizontal cross-sectional view illustrating the marking device 20, taken along the line A—A of FIG. 3. FIG. 4(b) is a horizontal cross-sectional view illustrating the marking device 20, taken along the line B—B of FIG. 3. FIG. 5 is a front view illustrating a imprint mark formed on the top imprint portion of the marking device 20 (in this case, the mark represents "month" and "day" corresponding to a production date being production data of a molded piece).

In the first embodiment shown in FIGS. 2 to 5, the marking device 20 consists of a top imprint portion (member) 21, a base-end actuator 22, an intermediate connector 23, and a reference sleeve 24. A rotary configuration is formed of the top imprint portion 21, the base-end actuator 22, and the intermediate connector 23. The top imprint portion 21 is disposed near the cavity 4a through the core 5a. The base-end actuator 22 is protruded and exposed to the space S from the backing plate 6. The intermediate connector 23 couples the top imprint portion 21 and the base-end actuator 22. The reference sleeve 24 is forcibly inserted into the countersunk hole 5b of the core 5a or is fit and positioned without any free rotation. The reference sleeve 24 has a reference imprint mark 24a at a predetermined position of the end surface thereof.

The top imprint portion 21 has a "day" mark sleeve (corresponding to "sleeve member" in the claims) 31 rotatably journaled and stopped by the stop ring 32 and a "month" mark pin (corresponding to "pin member" in the claims) 41 rotatably journaled and stopped by the stop ring 42 within the "day" mark sleeve 31. Day imprint marks (corresponding to the data imprint marks or the first data imprint marks in claims) 31a in relief for intaglio, which are formed of mirror-image (i.e. a reversed image) numbers of numbers "1", "2", . . . , and "31" representing 31 days as the date, are formed along the same circumference at equal angle intervals on the end surface (being the front end surface and corresponding to "top display imprint surface" or "first top imprint surface" in claims) of the mark sleeve 31. Month imprint marks (corresponding to the data imprint mark or the second data imprint mark in the claims) 41a in relief or intaglio, which are formed of mirror-image (reversed) numbers of numbers "1", "2", . . . , "12" representing 12 months as the date, are formed along the same circumference at equal angle intervals on the end surface (being the front end surface and corresponding to "top display imprint surface" or "first top imprint surface" in claims) of the mark pin 41.

A nearly-L-shaped bracket 51 is attached to the backing plate 6 with a mounting screw 52. The base-end actuator 22 is rotatably journaled to the bracket 51 via the backing plate 6. The stop ring 62 pulls the actuator 22 outward at a rotary position. The base-end actuator 22 has a "day" mark selector (corresponding to "base-end actuator" or "first base-end actuator" in the claims) 61 and a "month" mark selector (corresponding to "base-end actuator" or "second base-end actuator" in the claims) 71. The "day" mark selector 61 has "day" notches (corresponding "to the data display indicators" or "first data display indicators" in the claims) 61a formed at reference positions on the circumferential surface representing "day" corresponding to "day" stamp marks 31a on the "day" mark sleeve 31. The "month" mark selector 71 is disposed on the "day" mark selector 61 side by side and is rotatably journaled, with the center thereof inserted into the center of the "day" mark selector 61. The "month" mark selector 71 is pulled at a rotational position with the stop ring 72. The "month" mark selector 71 has "month" notches (corresponding to the data display indicator" or "second data display indicator" in the claims) 71a formed at the corresponding reference positions on the circumferential surface representing "month" corresponding to "month" stamp marks 41a on the "month" mark pin 41. A notch ball 53, protruded normally and resiliently by the bracket 51, is selectively and moderately notch-engaged to each "month" notch 61a. A notch ball 54, protruded normally and resiliently by the bracket 51, is selectively and moderately notch engaged to each "day" notch 71a.

In the intermediate connector 23, as shown in FIG. 4(a), the connection sleeve (corresponding to "connection member" or "first connection member" in the claims) 55 is connected to the "day" mark sleeve 31 and the "day" mark selector 61 so as to prevent the rotation of them. The connection sleeve 55 has its connection ends each having a polygonal cross section (in this case, a hexagonal cross section). Moreover, as shown in FIG. 4(b), the connection sleeve (corresponding to "connection member" or "second connection member" in the claims ) 56 is connected to the "month" mark sleeve 41 and the "month" ark selector 71 so as to prevent the rotation of them. The connection sleeve 56 has its connection ends each having a polygonal cross section (in this case, a hexagonal cross section).

In the first embodiment shown in FIGS. 1 to 5, the Day" mark selector 61 and the "month" mark selector 71 are notch-selected and moderately rotated respectively. Thus, the "day" imprint mark 31a of the "day" imprint sleeve 31 and the "month" imprint mark 41a of the "month" mark pin 41 can be set respectively and arbitrarily to the reference imprint mark 24a of the reference sleeve 24. As a result, a desired stamp mark is marked on a molded piece. That is, a mark to be stamped on a molded piece can be easily changed without disassembling the molding tool.

In this case, certain signs (not shown) (corresponding to "data display indicator" in the claims) may be displayed corresponding to the imprint marks 31a and 41a to indicate the positions selectively set by the notch rotation of the "day" mark selector 61 and the "month" mark selector 71. Thus, the first embodiment can be more effectively applied. The connection sleeve 55 connects the "day" mark sleeve 31 and the "day" mark selector 61 without any rotation while the connection sleeve 56 connects the "month" mark pin 41 and the "month" mark selector 71 without any rotation. Hence, variations in thickness of the fixing-side blank 5 or the backing plate 6 can be handled by adjusting the length of the connection sleeves 55 and 56. As a result, the present embodiment can be advantageously applied to various molding tools.

According to the present embodiment, since the setting of the "day" mark sleeve 31 and the "month" mark pin 41 can be externally selected, the notch engaging mechanism maintains the "day" mark selector 61 and the "month" mark selector 71 to selected positions. However, another drive mechanism with a warm gear and a screw meshed together may be used to externally select the "day" mark selector 61 and the "month" selector 71. Moreover, selective operation means with other feeding mechanism may be applied. Here, it has been explained that "month" and "day" are inscribed as stamp marks on a molded piece. However, under the same intention, either the "day" mark sleeve 31 and the "month" mark pin 41, or the "day" mark selector 61 and the "month" mark selector 71 may mark "month" or "day" only. If necessary, other data, e.g. a mold lot number, regarding molding may be marked, instead of "month" and/or "day".

In the first embodiment, the "day" mark sleeve 31 may be inter-linked with the "day" mark selector 61 without any free rotation. The "month" mark pin 41 may be inter-linked with the "month" mark selector 71 without any free rotation. That is, a modification of the intermediate connector 23 can be configured as shown in FIGS. 6 and 7.

Figure 6:
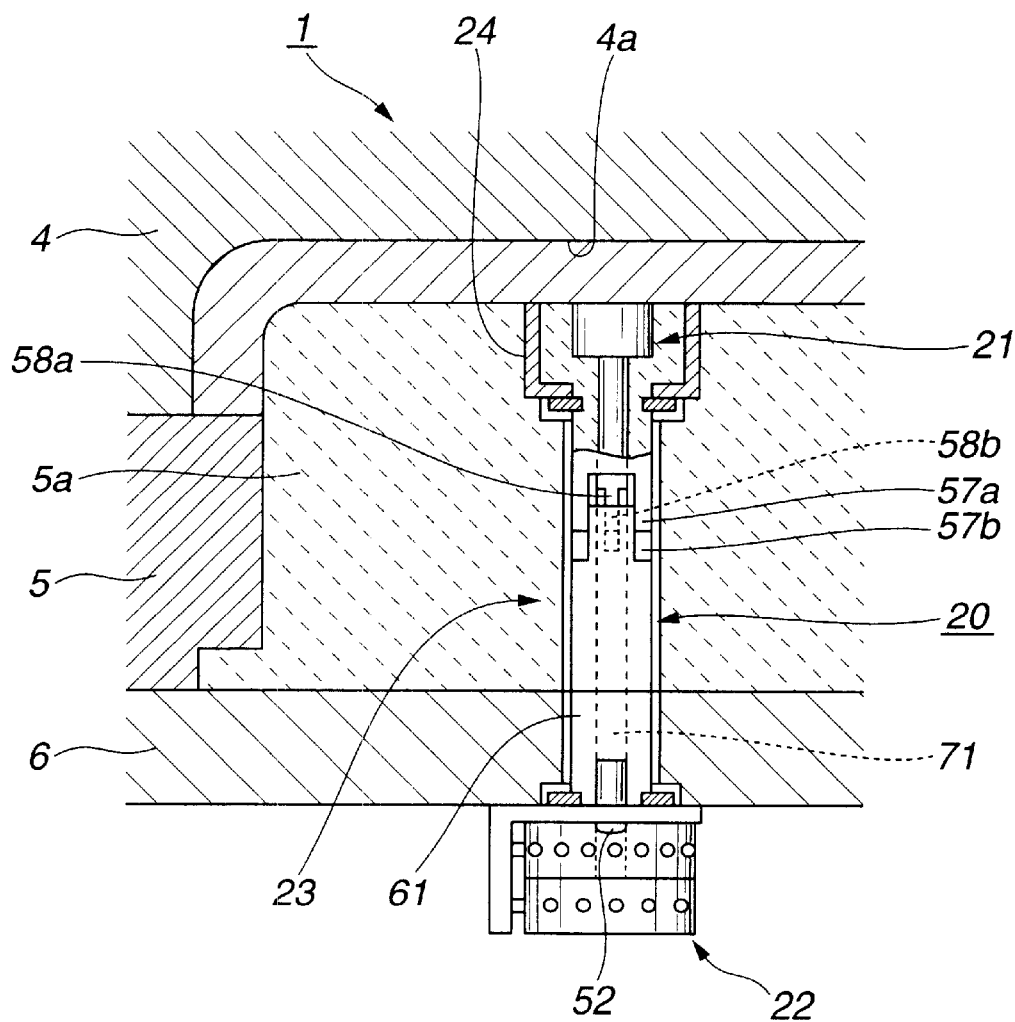
FIG. 6 is a vertical cross-sectional view illustrating the main portion of a making device engaged in an intermediate connector and assembled to a die, corresponding to the structure of FIG. 2, according to another example of the first embodiment of the present invention.

FIG. 6 is a vertical cross-sectional view illustrating the main portion, corresponding to that of FIG. 2, of the marking device 20 built in the molding tool 1 by means of the intermediate connector, according to another embodiment. FIG. 7 is a horizontal cross-sectional view illustrating an enlarged intermediate connector of FIG. 6.

Figure 7:
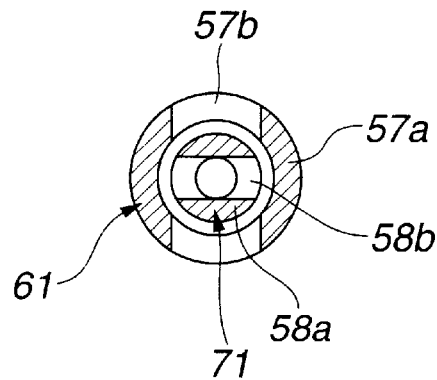
FIG. 7 is a horizontal cross sectional view illustrating an enlarged configuration of the intermediate connector.

As clearly understood from FIGS. 6 and 7, the "day" mark sleeve 31 has an incomplete circular protrusion 57a which is partially locked radially from the shaft core. The "day" mark selector 61 has an incomplete circular recess 57b for receiving axially and slidably and loosely the circular protrusion 57a. The incomplete circular protrusion 57a and the incomplete circular recess 57b are coupled together to interconnect the "day" mark sleeve 31 and the "day" mark selector 61. The "month" mark pin 41 has an incomplete circular protrusion 58a which is partially lacked radially from the shaft core. The "month" mark selector 71 has an incomplete circular recess 57b for receiving axially and slidably and loosely the circular protrusion 58a. The incomplete circular protrusion 58a and the incomplete circular recess 58b are coupled together to interconnect the "month" mark pin 41 and the "month" mark selector 71. Thus, this modification can provide the same function and effect as those of the first embodiment.

Next, the second embodiment of the present will be described below in detail.

Figure 8:
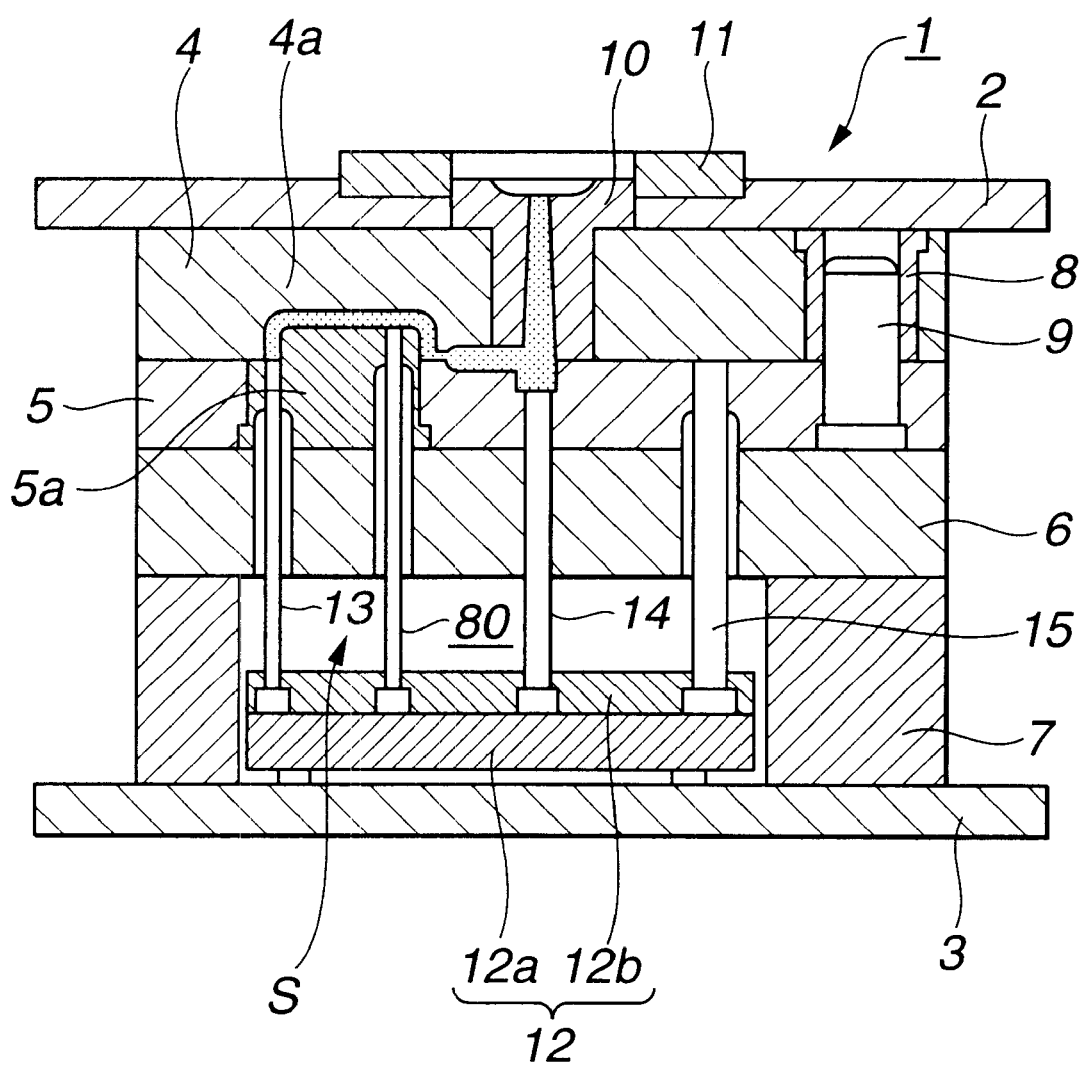
FIG. 8 is a vertical cross sectional view illustrating a making device according to a second embodiment of the present invention.

FIG. 8 is a vertical cross-sectional view illustrating a marking device built in a molding tool, according to the second embodiment of the invention. The basic configuration of FIG. 8 is similar to that of the first embodiment of FIG. 1. Hence, a duplicate explanation thereof will be omitted by labeling the same numerals to the same or similar constituent elements.

In the second embodiment shown in FIG. 8, the marking device 80 including the ejector pin 81 with a marker is used instead of the above-mentioned marking device 20.

Figure 11B:
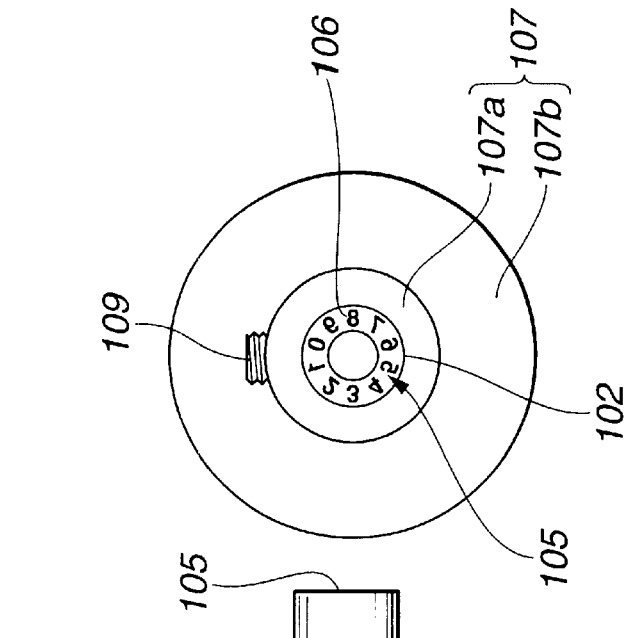
FIG. 11(b) is an end view illustrating the top end of the sleeve.
Figure 11A:
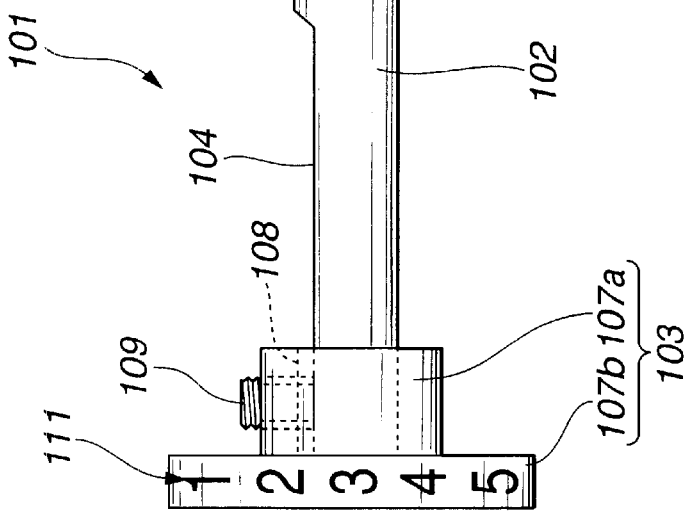
FIG. 11(a) is a side view illustrating a sleeve of the ejector pin.
Figure 11C:
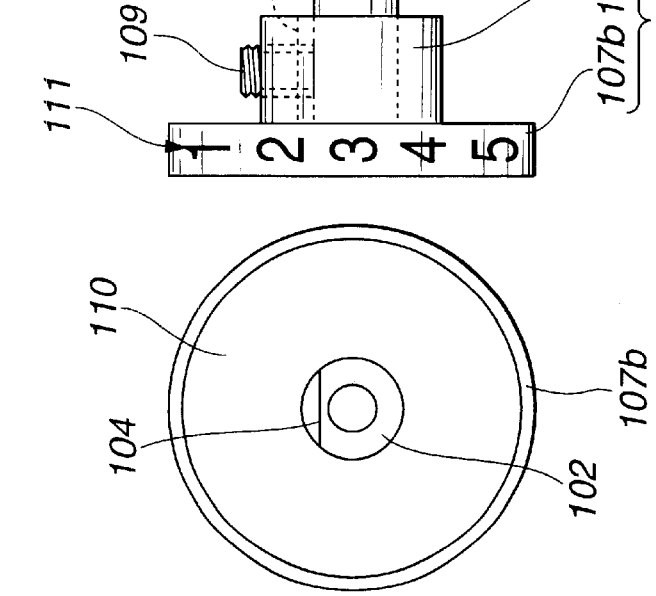
FIG. 11(c) is an end view illustrating the base end of the sleeve.
Figure 12:
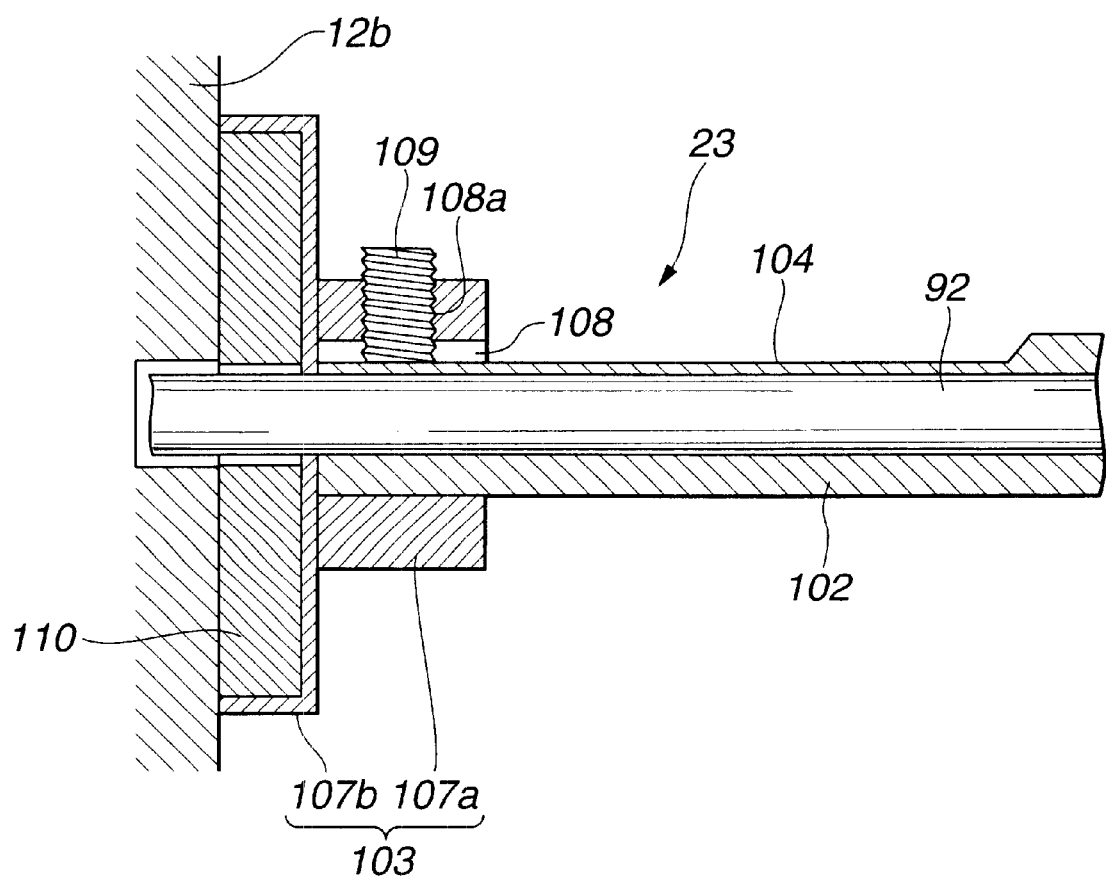
FIG. 12 is a vertical cross-sectional view illustrating the sleeve of the ejector pin through which the pin is inserted.

FIGS. 9(a) and 9(b) show the enlarged outline of the marking device 80 built in the molding tool 1 according to the second embodiment. FIG. 9(a) is a vertical cross-sectional view illustrating the main portion of the marking device 80. FIG. 9(b) is an explanatory diagram illustrating the top mark surface of the ejector pin 81 with a marker, viewed from the cavity side. FIG. 10(a) is a side view illustrating the pin member of the ejector pin 81 with a marker. FIG. 10(b) is an end view illustrating the pin member of the ejector pin 81 with a marker. FIG. 10(c) is an end view illustrating the base end of the pin member of the ejector pin 81 with a marker. FIG. 11(a) is a side view illustrating the sleeve of the ejector pin 81. FIG. 11(b) is an end view illustrating the front end of the sleeve of the ejector pin 81. FIG. 11(c) is an end view illustrating the base end of the sleeve of the ejector pin 81. FIG. 12 is a vertical cross-sectional view of the pin inserted into the sleeve of the ejector pin 81.

In the second embodiment shown in FIGS. 8 to 12, the ejector pin 81 of the marking device 80 consists of a pin 91 and a sleeve 101 through which the pin 91 is inserted and which rotatably supports the pin 91. The ejector pin 81 is attached to the eject plate 12(12a, 12b) of the molding tool 1.

The pin member 91, as shown in FIGS. 10(a), 10(b) and 10(c), consists of a rod 92 of a predetermined length and a flange 93 inserted to the base end of the rod 92. The flange 93 on the base end of the rod 92, as shown in FIG. 9, is sandwiched between the ejector plates 12a and 12b. The base end of the rode 92 has the flat surface 94 for stopping rotation of the rod 92. The reference imprint mark 96 in relief or intaglio is formed on the top surface 95 to mark a portion of a molded piece. The reference imprint mark 96 is shaped in an arrow to indicate the data imprint mark of the sleeve 101 (to be described later).

As clearly understood from FIG. 10(a), a through hole 97 through which the rod 92 is inserted and a threaded hole 97a communicated with the through hole 97 are formed in the flange 93. The flange 93 is mounted on the flat surface 94 of the rod 92 with a screw 98. The reference display indicator 99, which indicates the reference direction of the reference imprint mark 96 of the rod 92, is displayed on a portion of a visible circumferential surface of the flange 93. The reference display indicator 99 directs the reference of the arrow (the point of the arrow), that is, the reference imprint mark 96 on the front-end surface of the rod 92.

The sleeve 101, as shown in FIGS. 11(a), 11(b) and 11(c), consists of a cylindrical sleeve 102 of a predetermined length and a ring rotary actuator 103 attached on the base end of the sleeve 102. The rod 92 of the pin 91 is inserted into the sleeve 102 and is rotatably journaled by the cylindrical sleeve 102. The sleeve 102, as shown in FIG. 9, is fitted with the rod 92 of the pin 91. The base end of the sleeve 102 has a flat surface 104. Data imprint marks 106, as shown in FIG. 11(b), are formed on the end surface 105 and along the same circumference at equal angular intervals. Each data imprint mark 106 is formed in relief or intaglio to be imprinted on a portion of a molded piece. Each data imprint mark 106 is a mirror-image number of "1", "2", . . . , or "9" representing the first digit of "day". The reference mark 96 of the pin 91 indicates each mirror-image number.

As clearly understood from FIGS. 11(a) and 12, the rotary actuator 103 is formed of a shaft boss 107a and a large cup-like rotary ring 107b. An insertion hole 108 through which the sleeve 102 is inserted as well as a mounting threaded hole 108a communicated with the insertion hole 108 are formed in the shaft boss 107a. The shaft boss 107a is fixed on the flat surface 104 of the sleeve 102 by means of the mounting screw 109. A magnet ring 110 is disposed inside the cup of the rotary ring 107b to attract the eject plate 12b on the shaft boss 107a for temporal fixing. Data imprint mark indicators 111, that is, normal numbers "1", "2", ..., "9" corresponding to the imprint marks 106 of the sleeve 101 are displayed on the visible periphery. The arrangement of data display indicators 111 correspond to that of data imprint marks 106.

The ejector pin 81 with a marker of the marking device 80 is built in the molding tool 1. The end surface 95 of the pin 91 on which the reference imprint mark 96 is formed as well as the end surface of the sleeve 101 on which data imprint marks 106 are formed are flush with the surface of the cavity 4a.

In the embodiment shown in FIGS. 8 to 12, the mark to be imprinted on a molded piece can be changed by selectively rotating the rotary actuator 103 and then by setting a desired data display indicator 111 (the first digit of the "day") of the rotary actuator 103 to the reference display indicator 99 of the flange 93. The selective rotation allows the reference imprint mark 96 on the end surface 95 to set the data stamp mark 106 selected on the end surface 105. In this aspect, the updated imprint mark representing the first digit of "day" is marked on a predetermined portion of a mold piece. As described above, the stamp mark can be changed without disassembling the molding tool.

In the present embodiment, the pin 91 is configured of the rod 92 and the flange 93. However, the pin 91 may be constructed as one-piece component. Similarly, the sleeve component 102 may be integrated with the rotary actuator 103 to make the sleeve 101. In the embodiments, an arrow is used as the reference imprint mark 96 on the pin 91. However, a combination of an arrow and other display, e.g. "year" may be used instead of the arrow. The data imprint mark 106 on the end surface of the sleeve 102 may be either the tenth digit of a number or the "year, month, and day".

Figure 13:
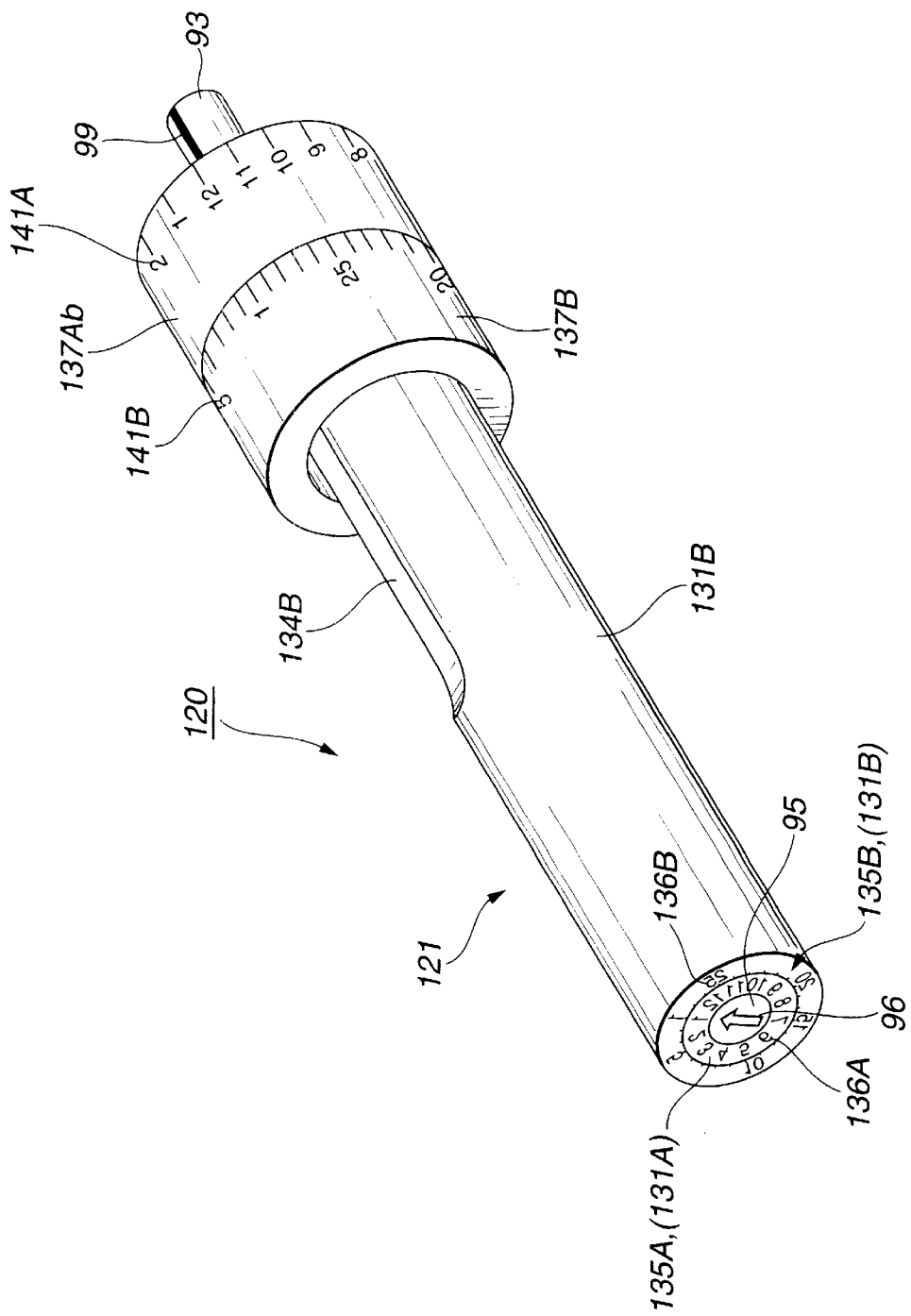
FIG. 13 is a perspective view illustrating the appearance of an ejector pin with a marker in a marking device, according to a first modification of the second embodiment.
Figure 14:
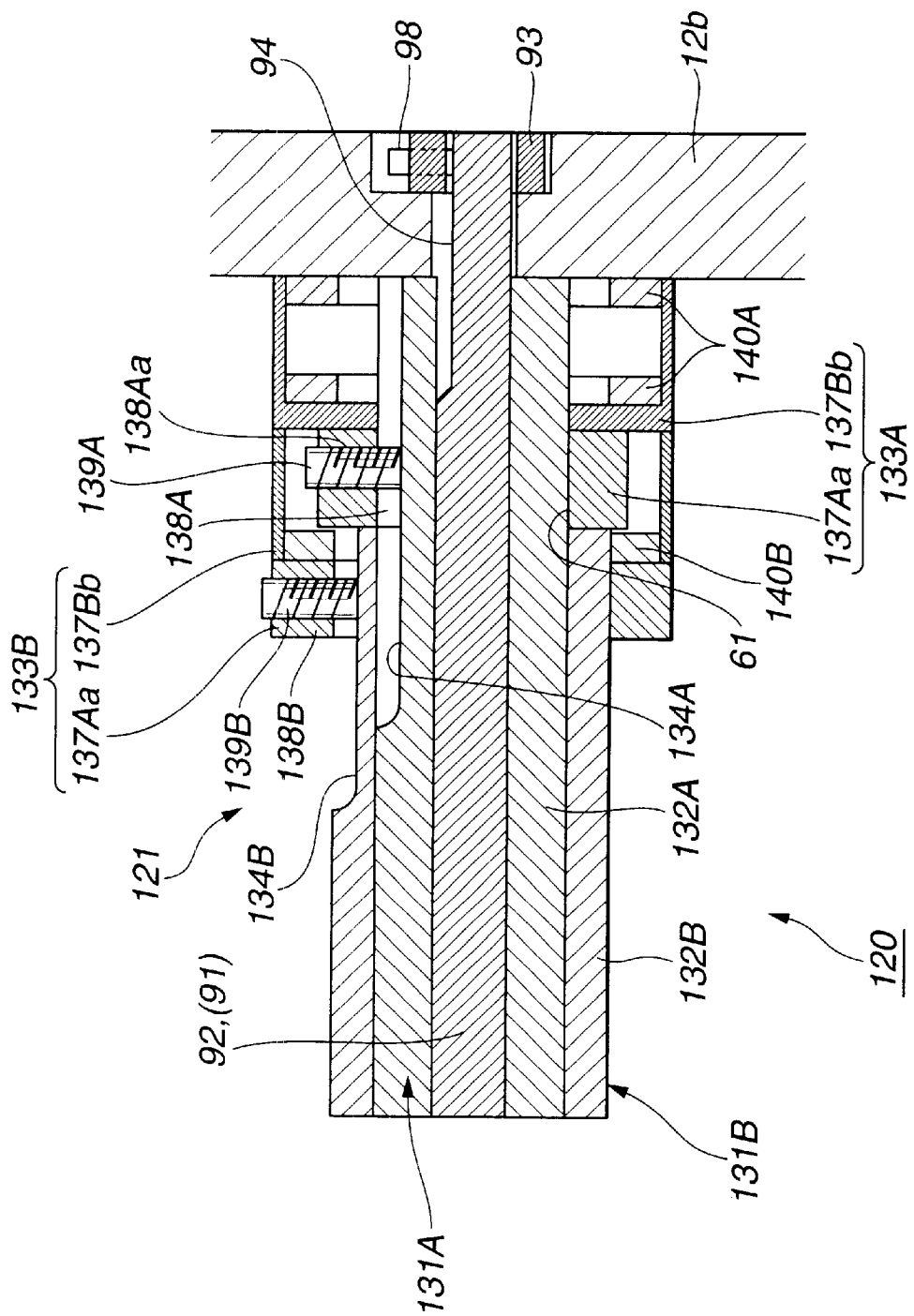
FIG. 14 is a vertical cross sectional view illustrating the main portion of the marking device assembled to a molding tool.

FIGS. 13 and 14 illustrate the making device 120 according to a modification of the second embodiment. FIG. 13 is a perspective view illustrating the outline of the ejector pin 121 with a marker configuring the marking device 120. FIG. 14 is a vertical cross-sectional view illustrating the main portion of the marking device 120 built in the molding tool 1. The first modification includes the configuration corresponding to the pin 91 in the second embodiment of FIGS. 8 to 12. The same numerals are utilized for like elements or their equivalents. Hence, a duplicate explanation thereof will be omitted here.

The ejector pin 121 with a marker of the first modification has a two-concentric structure of the sleeve 101. That is, in the ejector pin 121 shown in FIG. 14, a lower (inner) sleeve 131A and an upper (outer) sleeve 131B are sequentially fitted to the pin 91 so as to rotate around the pin 91. The inner sleeve 131A marks the "month" while the outer sleeve 131E marks the "day".

The inner sleeve 131A is configured of a cylindrical sleeve 132A that accepts and rotatably journals the rod 92 of the pin 91 and a ring rotary actuator 133A mounted on the base end of the sleeve 132A. The rod of the pin 91 is inserted into the sleeve 132A. The sleeve 132A has a flat portion 134A on a side surface of one end to prevent free rotation. Data imprint marks 136A are mirror-image letters of numbers "1", "2", ... and "12" representing "month". The reference imprint mark 96 of the pin 91 indicates each of the mirror-image numbers.

The rotary actuator 133A is configured of a shaft boss 137aA and a cup-like rotary ring 137Ab. A through hole 138A penetrating the sleeve 132A and a mounting threaded hole 138Aa communicated with the through hole 138A are formed in the shaft boss 137Aa. The rotary actuator 133A is fixed on the flat surface 134A of the sleeve 132A with the mounting screw 139A. Magnet rings 140A and 140B are temporarily disposed inside the cup of the rotary ring 137Ab to attract the ejector plate 12b and the shaft boss 137Aa. Reference display indicators 141A, that is, normal numbers "1", "1", "2", ..., and "12", respectively corresponding to data imprint marks 136A on the sleeve 131A are displayed on the visible outer periphery of the rotary ring 137Ab. The location of each reference display indicator 141A agrees with that of the corresponding data imprint mark 136A.

The outer sleeve 131B consists of a cylindrical sleeve 132B accepting and rotatably journaling an inner sleeve 131A and a ring rotary actuator 133B attached to the base end of the sleeve 132B. The sleeve 132A of the inner sleeve 131A is inserted into the sleeve 132B that has a flat surface 134B on the base end to prevent free rotation. Data imprint marks 136B are formed at equal angular intervals on the end surface 135B of the sleeve 132B. Each data imprint mark 136B is a mirror-image letter of the number "1","5", "10", "15", "20", or "25" corresponding to "1","2", ..., or "31" representing "day". The reference imprint mark 96 of the pin 91 remotely indicates the mirror-image number of each data imprint indicator 136A representing "month".

The rotary actuator 133B consists of a shaft boss 137Ba and a rotary ring 137Bb having nearly the same diameter as that of the rotary ring 137Ab. The shaft boss 137Ba has a through hole 138B penetrating the sleeve 132B and a mounting threaded hole 138Ba communicated with the insertion hole 138B. The shaft boss 137Ba is fixed on the flat surface 134B of the sleeve 132B with the mounting screw 139B. The shaft boss 137Aa is disposed inside the rotary ring 137Bb to butt the end thereof against the rotary ring 137Ab. The magnet ring 140B is temporarily disposed inside the rotary ring 137Bb to attract the shaft boss 137Ba. Reference display indicators 141B, or normal numbers "1", "5", "10", "15", "20", and "25", respectively corresponding to data imprint marks 136B on one end of the sleeve 131B are displayed on the visible outer periphery of the rotary ring 137B. The rotary ring 137B has nearly the same diameter as that of the rotary ring 137Ab. The arrangement of the reference indicators 141B corresponds to that of the data imprint marks 136B.

In the first modification shown in FIGS. 13 and 14, the mark to be imprinted a molded piece is changed as follows. First, the rotary actuator 133A is selectively rotated to set a desired indicator 141A (for "month") of the rotary actuator 133A to the reference display indicator 99 of the flange 93. Next, the rotary actuator 133B is selectively rotated to set a desired indicator 141B (for "day") of the rotary actuator 133B to the reference display indicator 99 of the flange 93, differently from the indicators 141A. The selective operation allows the reference imprint mark 96 to indicate a data imprint mark 136A selected on the end surface 135A and a data imprint mark 136B selected on the end surface 135B. In this aspect, the single ejector pin 121 with a marker can mark a "month" imprint and a "day" imprint on a desired surface of a molded piece. That is, in the first modification, the "month" and "day" imprints to be marked on a molded piece can be changed without disassembling the molding tool.

In this embodiment, the sleeve 131A is divided into the sleeve components 132A and 132B while the sleeve 131B is divided into the sleeve components 133A and 133B. However, the sleeve components 132A and 132B can be integrated as one piece while the sleeve components 133A and 133B can be integrated as one piece.

Figure 15:
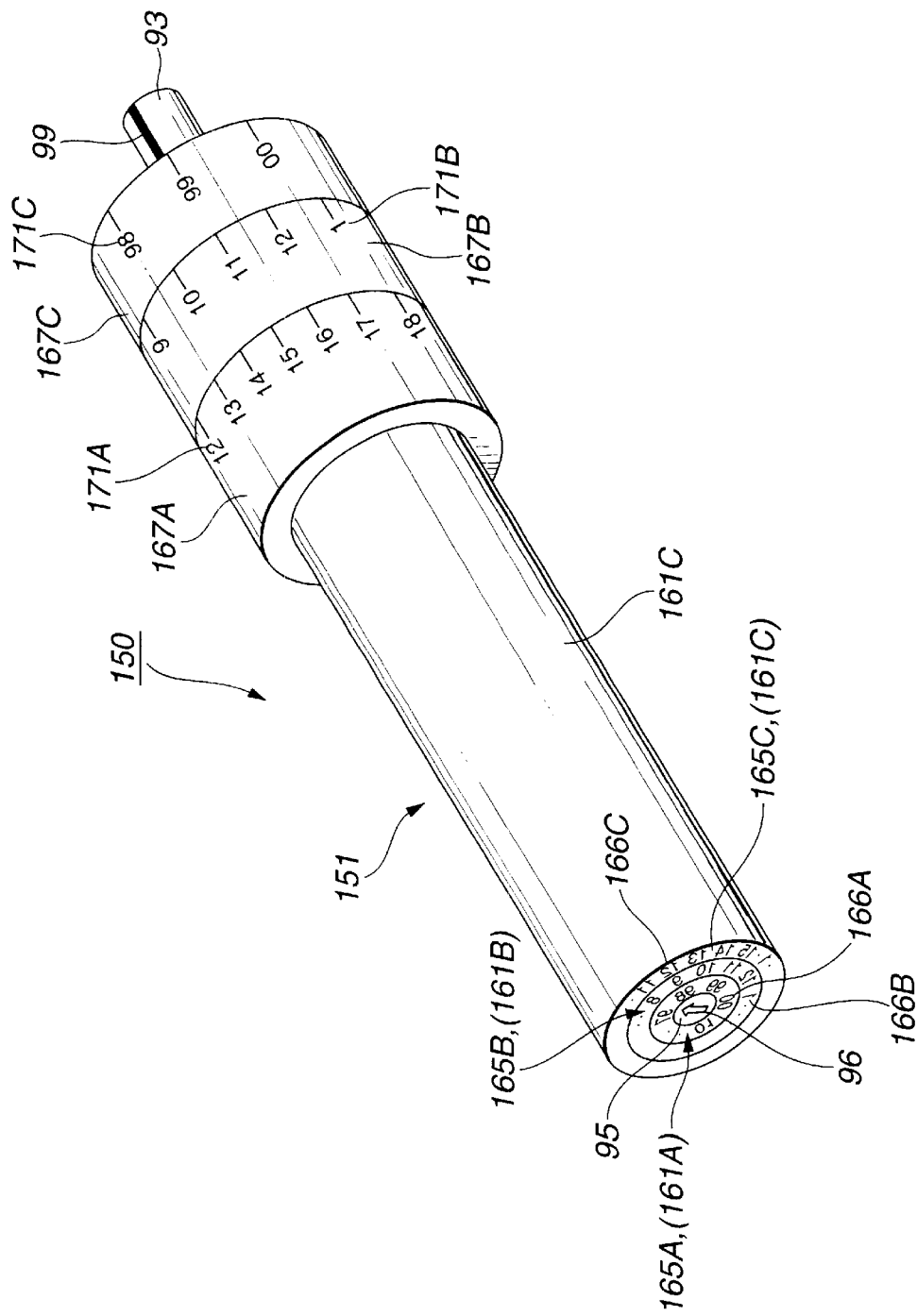
FIG. 15 is a perspective view illustrating the appearance of an ejector pin with a maker in a marking device, according to a second modification of the second embodiment.

FIG. 15 illustrates the marking device 150 according to the second modification of the second embodiment. FIG. 15 is a perspective view illustrating the outline of the ejector pin 151 with a marker constituting the marking device 150. The second modification includes the configuration corresponding to the pin 91 of the second embodiment of FIGS. 8 to 12. The same numerals are used for like elements or the equivalents thereof. Hence, a duplicate explanation thereof will be omitted.

In the second modification, the ejector pin 151 with a marker has a three concentric structure of sleeves 101. Referring to FIG. 15, the ejector pin 151 has a lower (inner) sleeve 161A, an intermediate sleeve 161B, and a lower (outer) sleeve 161C, which are fitted to the pin 91. The sleeves 161A, 161B, and 161C can be freely rotated around the pin 91. The last two digits of the "year" are imprinted with the inner sleeve 161A. The "month" is imprinted with the intermediate sleeve 161B. The "day" is imprinted with the outer sleeve 161C.

The inner sleeve 161A is inserted into the intermediate sleeve 161B. The sleeve 161B is inserted into the sleeve 16C. That is, the sleeves 161A, 161B and 161C are concentrically disposed, like the first modification. In this case, correcting numbers are attached to the corresponding elements (A and B in the 130s correspond to A, B, and C of the 160s in the second modification while A and B in the 140s correspond to A, B, and C of the 170s in the second modification).

Mirror-image numbers of "99", "00", . . . , or "05" representing the last two digits of "year" are formed on the end surface 165A of the inner sleeve 161A. Data display indicators 171A, that is, normal numbers "99", "00", . . . , and "05", respectively corresponding to data imprint marks 166A are displayed on the rotary ring 167Ab of the rotary actuator 163A. The mirror-image numbers of "1", "2", . . . and "12" representing "month" are formed as data imprint marks 166B on the end surface of the intermediate sleeve 161B. The data display indicators 171B, that is, normal numbers "1", "2", . . . , and "12", corresponding to data imprint marks 166B are displayed on the rotary ring 167Bb of the rotary actuator 163B. Mirror-image numbers of "1", ¢2", . . . , "31" representing "day" are formed as data imprint marks on the end surface 165C of the outer sleeve 161C. The data display indicator 171C, that is, normal numbers "1", "2", . . . , and "31", corresponding to data imprint marks 166C are displayed on the rotary ring 167Cb of the rotational actuator 163C.

In the second modification shown in FIG. 15, the selective rotary operation to change a mark to be stamped on a molded piece is performed in conformance with the operation of the first modification. A single ejector pin 151 with a marker can mark "the last two digits of year", "month", and "day" on a desired portion of a molded piece. That is, in the second modification, "the last two digits of the "year", "month", and "day" to be marked on a molded piece can be changed without disassembling the molding tool.

Next, the third embodiment of the present invention will be explained below in detail.

Figure 16A:
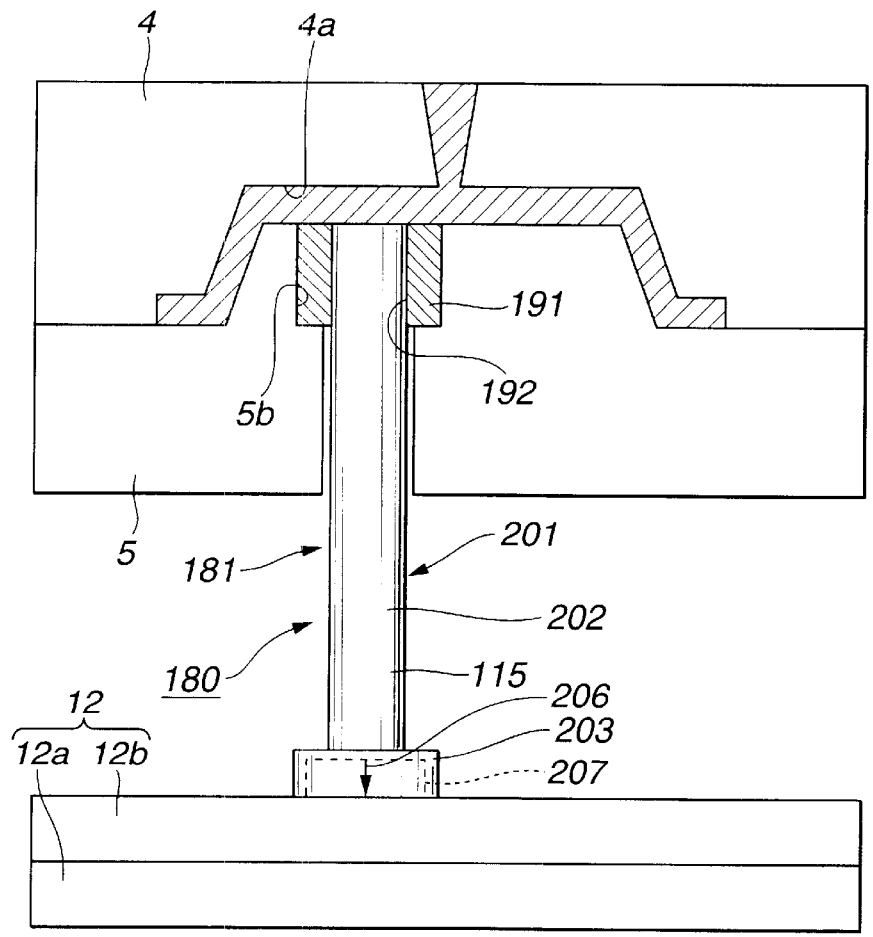
FIG. 16(a) is a vertical cross sectional view schematically illustrating a marking device attached to a molding tool, according to the third embodiment of the present invention.
Figure 16B:
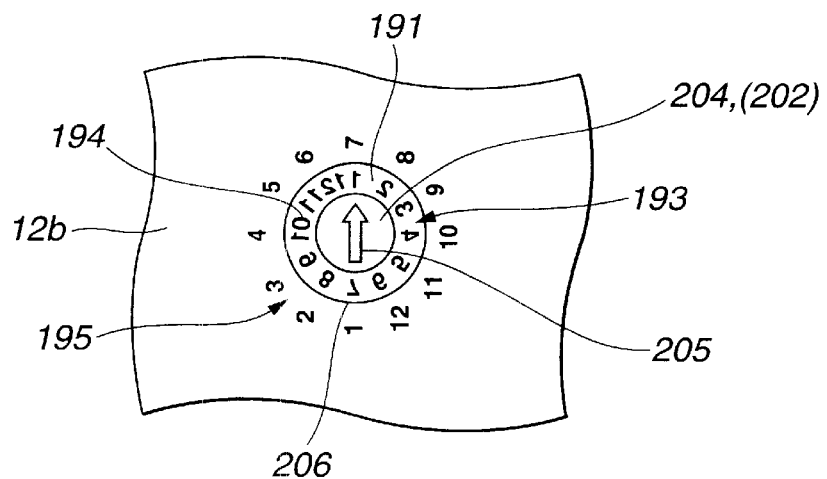
FIG. 16(b) is an explanatory diagram illustrating the correspondence relationship between an imprinting mark and the corresponding indicator, viewed from the ends of an ejector pin and a reference sleeve which are attached to the ejector plate of the marking device.

FIGS. 16(a) and 16(b) illustrate the marking device according to the third embodiment. FIG. 16(a) is a vertical cross-sectional view illustrating the marking device mounted on a molding tool. FIG. 16(b) is a plan view illustrating the relation ship between imprint marks and the corresponding indicator, viewed from one ends of the ejector pin and the reference sleeve mounted on the ejector plate of the marking device.

In the third embodiment shown in FIG. 16, the ejector 181 with a marker constitutes the marking device 180 and includes a reference sleeve 191 and a pin 201 having the end penetrating the reference sleeve 191.

The reference sleeve 191 is a cylindrical tube of a predetermined length and has a through hole through which the end of the pin 201 is inserted. Data imprint marks 194 are arranged on the end surface of the reference sleeve 191 at equal angular intervals. Each data imprint mark 194, as shown in FIG. 16(b), is a mirror-image letter of "1", "2", . . . , or "12" representing "month". The reference sleeve 191 is inserted into a recess 5b formed on the movable-side blank 5 of the molding tool 1 so as to expose to the cavity surface 4a the end surface thereof on which data imprint marks 194 are formed.

Data display indicators 195, each indicating a corresponding data imprint mark 194 of the reference sleeve 191, are displayed on the surface of the ejector plate 12b confronting the reference sleeve 191. When a data stamp mark 194, as shown in FIG. 16(b), is a mirror-image number of "1", "2", . . . , or "12" representing "month", the data display indicator 195 is the normal number of "1", "2", . . . , or "12" displayed on the opposite side to the mirror-image number.

The pin 201 includes a rod 202 and a cup-like flange 23. The rod 202 has one end inserted into the insertion hole 192 of the reference sleeve 191. The cup-like flange 203 is integrally formed with the base end of the rod 202. The length of the pin 201 corresponds to the length of the rod 202 plus the length of the cup-like flange 23. A reference imprint mark 205 is formed on the end surface 204. As shown in FIG. 16(b), the reference imprint mark 205 is flush with the data imprint mark 194 and is an arrow for indicating the position of each data imprint mark 194 of the reference sleeve 191.

A small-arrow-like reference display indicator 206 is displayed on the outer peripheral surface of the cup-like flange 203 to indicate the direction of the reference stamp mark 205 of the rod 202. Referring to FIG. 16(b), the reference display indicator 206 indicates a data imprint mark 194 of the reference sleeve 191. That is, the reference display indicator 206 is in parallel with the center axis of the pin 201 and cooperates with the movement of the arrow point of the reference imprint mark 205 of the rod 202. A magnet ring 207 is buried inside the cup-like flange 203 to rotatably hold the pin 201 to the ejector plate 12b.

The configuration in the third embodiment shown in FIG. 16 executes the following selective rotary operation to change a mark to be formed on a molded piece. That is, the rod 202 is selectively rotated against the attraction of the magnet ring 207 until the reference display indicator 206 indicates a desired corresponding data display indicator 195 on the ejector plate 12b. In this case, "month" is marked on a portion of a molded piece. That is, in the third embodiment, "month" to be imprinted on a molded piece can be changed without disassembling the molding tool.

In the first to third embodiments and the first and second modifications of the second embodiments, each of the marking devices 20, 80, 180 and 150 has the function of marking a mark to identify a molded piece. Each marking device can be easily attached to the molding tool 1, in a similar machining to that applied to the existing ejector pins. The above-mentioned marking devices have the following effectiveness and advantages.

In the marking device according to each embodiment and each modification, the marking mode of the top imprinting member can be arbitrarily changed by selectively rotating the base end actuator and the mode after setting can be easily checked. Since the reference indicator for a change in setting and for confirmation is displayed in a normal character or number, it can be easily read on the side of the base end actuator. Hence, an erroneous reading can be avoided, contrary to the conventional case where the mirror-image (reversed) characters or numbers are read on the side of the top imprint member.

A mark to be imprinted on a molded piece can be easily changed form the outside, with the molding tool assembled to a molding tool. Hence, the marking device of the present invention can often change imprint data in a short time. For instance, the production lots of molded items can be easily controlled in divided sections.

In each of the embodiments, the reference imprint mark is oriented in a fixed direction and the data imprint mark is rotated to change the imprint mark. Numbers or characters acting as imprint marks always indicate the same position as that of the reference imprint mark. Hence, the improved marking device provides ease of reading of the reference imprint mark and particularly provides the advantage in displaying plural sets of data.

The conventional marker shown in FIG. 17 requires to mount two markers to a molding tool when two kinds of stamp marks are displayed. However, according to the present invention, one marker can handle two types of imprint marks, thus saving the installation space.

In the second and third embodiments, the magnet disposed on the side of the ejector plate enables the marking device to rotatably be held. However, it should be noted that the present invention is not limited only to the above-mentioned embodiments. Other equivalent rotary mechanisms may be used to the marking device of the present invention.

In the above-mentioned embodiments, any display indictor that can be easily recognized from the outside may be applied to the present invention. It is effective to use plural data display indicators color-coded. Fabricating a suitable portion of the rotary actuator with a transparent material may make it easy to check visually the imprint marks.

As described above, in the marking device for a molding tool according to the present invention, when the base-end actuator of the pin is selectively rotated, a desired data imprint mark on the front-end stamping member confronting the molding area can be accurately and simply set to the reference imprint mark of the reference sleeve. Thus, stamp marks, which are simultaneously imprinted on a molded piece at the same time the molded piece is formed, are changed. As a result, data regarding imprint marks can be easily changed. The pin can be easily machined and assembled.

In the marking device for a molding tool of the present invention, the data display indicator of the pin is selectively set to the reference display indicator by rotating the base-end actuator. Thus, a desired data imprint mark on the front-end stamping member confronting the molding area can be easily and accurately set to the reference imprint mark of the reference sleeve. As a result, the marking device can easily change data regarding imprint marks.

Moreover, in the marking device for a molding tool of the present invention, the first base-end actuator of the sleeve and the second base-end actuator of the pin are rotated respectively and selectively. A desired first data imprint mark of the first top stamping member confronting the molding area and a desired second data imprint mark of the second top stamping member confronting the molding area can be accurately and simply set to the reference imprint mark of the reference sleeve. Hence, data regarding imprint marks can be easily changed.

In the marking device for a molding tool of the present invention, plural data imprint marks respectively corresponding to plural data display indicators of concentric sleeves can be accurately and simply set to the reference imprint mark of the reference sleeve. Hence, data regarding imprint marks can be easily changed.

In the marking device for a molding tool of the present invention, the sleeve and the pin can be easily machined and assembled.

In the marking device for a molding tool of the present invention, when the first base-end actuator of the sleeve and the second base-end actuator of the pin are rotated, the first data display indicator of the sleeve and the second data display indicator of the pin are selectively set to the reference display indicator. Thus, a desired first data imprint mark on the first front-end stamping member confronting the molding tool and a desired second data imprint mark on the second front-end stamping member confronting the molding area can be accurately and simply set to the reference imprint mark of the reference sleeve. As a result, data regarding imprint marks can be easily changed.

In the marking device for a molding tool of the present invention, a desired data imprint mark on the top imprinting member confronting the molding area can be accurately and simply set to the reference imprint mark of the reference sleeve, by selectively rotating the base-end actuator of the pin. Hence, the marking device can easily change data regarding imprint marks. Moreover, the pin can be easily machined and assembled.

In the marking device for a molding tool of the present invention, the data display indicator on the pin is selectively set to the reference display indicator in the rotary operation of the base-end actuator. Thus, a desired data imprint mark on the top stamping member confronting the molding area can be accurately and simply set to the reference imprint mark of the reference sleeve. As a result, the data regarding imprint marks can be easily changed.

In the marking device for a molding tool of the present invention, the first base-end actuator of the sleeve and the second base-end actuator of the pin are respectively and selectively rotated. Thus, a desired first data imprint mark on the first top stamping member confronting the molding area and a second desired data imprint mark on the second top stamping member confronting the molding area can be accurately and simply set to the reference imprint mark of the reference sleeve. As a result, the data regarding imprint marks can be easily changed.

In the marking device for a molding tool of the present invention, plural data imprint marks respectively corresponding to plural data display indicators of concentric sleeves can be accurately and simply set to the reference imprint mark of the reference sleeve. Hence, the data can be easily changed.

In the marking device for a molding tool of the present invention, the sleeve and the pin can be easily machined and assembled.

In the marking device for a molding tool of the present invention, when the first base-end actuator of the sleeve and the second base-end actuator of the pin are rotated, the first data display indicator of the sleeve and the second data display indicator of the pin can be selectively set to the reference display indicator. Thus, a desired first data imprint mark on the first top stamping member confronting the molding area and a desired second data imprint mark on the second top stamping member confronting the molding area can be accurately and simply set to the reference imprint mark of the reference sleeve. As a result, the data regarding imprint marks can be easily changed.

What is claimed is:

1. A marking device for a molding tool, said marking device including a fixing-side blank having a cavity and forming one section of said molding tool, a core confronting said cavity and forming the other section of said molding tool, and a movable-side blank which can be relatively opened or closed to said fixing-side blank, said marking device being attached on the side of said cavity or core, such that a changeable mark is imprinted on a surface of a molded piece to be formed within a molding area between said cavity and said core, said marking device further comprising:

a reference sleeve having a reference imprint mark formed on a top reference imprint surface thereof exposed to said molding area; and a pin member rotatably journaled within said reference sleeve and having a top imprint member and a base end actuator, said top imprint member having a top display imprint surface which is flush with said top reference imprint surface, on which data imprint marks to be pointed by said reference imprint mark are formed, said base end actuator displaying data display indicators respectively corresponding to said data imprint marks, on a protrusion protruded from molding area outward;

wherein said base actuator is selectively rotatable so that a data imprint mark of said data input marks is selectable by said top imprint member set on the reference imprint mark of said reference sleeve.

2. The marking device defined claim 1, wherein said top imprint member and said base actuator of said pin member are respectively configured; and further comprising an additional connection member for mutually connecting said top imprint member and said base end actuator portion.

3. The marking device defined in claim 1 or 2, which comprises a reference display indicator wherein said base end actuator is rotatable to set a selected data display on said reference display indicator.

4. A marking device for a molding tool, said marking device including a fixing-side, blank having a cavity and forming one section of said molding tool, a core confronting said cavity and forming the other section of said molding tool, and a movable-side blank which can be relatively opened or closed to said fixing-side blank, said marking device being attached on the side of said cavity or core, whereby a changeable mark is imprinted on a surface of a molded piece to be formed within a molding area between said cavity and said core, said marking device further comprising:

a reference sleeve having a reference imprint mark formed on a top reference imprint surface exposed to said molding area;

a sleeve member rotatably journaled within said reference sleeve and including a first top imprinting member and a first base end actuator, said first top imprinting member having a first top display imprint surface flush with said top reference imprint surface, on which first data imprint marks to be pointed by said reference imprint mark are formed, said first base end actuator having a protrusion protruded from said molding area outward, on which first data display indicators respectively corresponding to said first data imprint marks are displayed; and a pin member rotatably journaled within said sleeve member and including a second top imprinting member and a second base end actuator, said second top imprinting member having a second top data imprint surface flush with said top reference imprint surface, on which second data imprint marks to be pointed by said reference imprint mark are formed, said second base end actuator having a protrusion protruded from said molding area outward, on which second data display indicators respectively corresponding to said second data imprint marks are displayed;

such that said first and second base end actuators are respectively and selectively rotatable based on said first data display indicator of said sleeve member and said second data display indicator of said pin member so that a first data imprint mark respectively selected on said first top imprinting member as well as a second data imprint mark respectively selected on said second top imprinting member are set on said reference imprint mark of said reference sleeve.

5. The marking device defined in claim 4, wherein the sleeve member of said first top imprinting member, on which said first data imprint marks are formed, as well as the sleeve of said second base end actuator, on which said first data display indicators are formed, have a concentric configuration.

6. The marking device defined in claim 4, wherein said first top imprinting member and said first base end actuator of said sleeve member as well as said second top imprinting member and said second base end actuator of said pin member are respectively configured; and further comprising a first connection member connecting said first top imprinting member and said first base end actuator, and a second connection member connecting said second top imprinting member and said second base end actuator.

7. The marking device defined in claim 4 or 6, which comprises a reference display indicator wherein said first base end actuator is rotatable to set a selected first data display indicator of said sleeve member on said reference display indicator and said second base end actuator is rotatable to set a selected second data display indicator of said pin member on said reference display indicator.

8. A marking device for a molding tool, said marking device having a fixing-side blank having a cavity and defining one section of said molding tool, a core forming the other section of said molding tool confronting said cavity, a molding area defined between said cavity and said core, a movable-side blank which can be relatively opened or closed to said fixing-side blank, and an ejector plate on which an ejector pin is disposed, the end surface of said ejector pin being exposed to said molding area through said core, said marking device being suitable to a molding tool wherein when said movable side blank is opened, a molded piece is ejected out of said molding area with said ejector pin, said marking device having the base end held to said ejector plate, with the front end surface confronting said molding area through said core, to form a changeable imprint mark on a surface of a molded piece to be formed in said molding area, said marking device comprising:

a reference sleeve having a reference imprint mark formed on a top reference imprint surface confronting said molding area; and a pin member rotatably journaled within said reference sleeve via said core and having a first top imprinting member and a first base end actuator, said first top imprinting member having a top display imprint surface flush with said top reference imprint surface, on which data imprint marks to be pointed by said reference imprint park are formed, said first base end actuator being held by said ejector plate protruded from said core outward, data display indicators respectively corresponding to said data stamp marks being displayed on a holding portion;

such that said base actuator is selectively rotatable based on each data stamp indicator of said pin member so that a data imprint mark selected by said top imprinting member is set on the reference imprint mark of said reference sleeve.

9. The marking device defined claim 8, wherein said first top imprinting member and said first base actuator of said pin member are respectively configured and further comprising an additional connection member for mutually connecting said first top imprinting member and said first base end actuator portion.

10. The marking device defined in claim 8 or 9, which comprises a reference display indicator wherein said base end actuator is rotatable to set a selected data display indicator of said pin member on said reference display indicator.

11. A marking device for a molding tool, said marking device having a fixing-side blank having a cavity and defining one section of said molding tool, a core forming the other section of said molding tool confronting said cavity, a molding area defined between said cavity and said core, a movable-side blank which can be relatively opened or closed to said fixing-side blank, and an ejector plate on which an ejector pin is disposed, the end surface of said ejector pin being exposed to said molding area through said core, said marking device being suitable to a molding tool where when said movable-side blank is opened, a molded piece is ejected out of said molding area with said ejector pin, said marking device having the base end held to said ejector plate, with the front end surface confronting said molding area through said core, to form a changeable imprint mark on a surface of a molded piece to be formed in said molding area, said marking device comprising:

a reference sleeve fixedly attached to said core, said reference sleeve having a reference imprint mark formed on a top reference imprint surface confronting said molding area;

a sleeve member rotatably journaled within said reference sleeve via said core and having a first top imprinting member and a first base end actuator; said first top imprinting member having a first top display imprint surface flush with said top reference imprint surface, on which first data imprint marks to be pointed by said reference imprint mark are formed, said first base end actuator having a holding portion protruded from said molding area outward and held by said ejector plate, on which first data display indicators respectively corresponding to said first data imprint marks are formed;

a pin member rotatably journaled within said reference sleeve and having a second top imprinting member and a second base end actuator, said second top imprinting member having a second top display imprint surface being flush with said top reference imprint surface and a first top display imprint surface, on which second data imprint marks to be pointed by said reference imprint mark are formed, said second base end actuator having a holding portion protruded from said molding area outward and held by said ejector plate, on which second data display indicators respectively corresponding to said second data imprint marks are formed;

such that said first and second base end actuators are respectively and selectively rotatable based on said first data display indicator of said sleeve member and said second data display indicator of said pin member so that a first data imprint mark respectively selected on said first top imprinting member as well as a second data imprint mark respectively selected on said second top imprinting member are set on said reference imprint mark of said reference sleeve.

12. The marking device defined in claim 11, wherein said first top imprinting member and said first base end actuator each include a sleeve member, on which said first data display indicators are formed, each said sleeve member having a concentric configuration with respect to one another.

13. The marking device defined in claim 11, wherein said first top imprinting member and said first base end actuator of said sleeve member as well as said second top imprinting member and said second base end accumulator of said pin member are respectively configured; and further comprising a first connection member connecting said first top imprinting member and said first base end actuator, and a second connection member connecting said second top imprinting member and said second base end actuator.

14. The marking device defined in claim 11 or 13, which comprises a reference display indicator wherein said first base end actuator is rotatable for setting a selected first data display indicator of said sleeve member on said reference display indicator and said second base end actuator is rotatable for setting a selected second data display indicator of said pin member on said reference display indicator.

* * * * *